US012793559B2

(12) United States Patent
Van Duren et al.

(10) Patent No.: US 12,793,559 B2
(45) Date of Patent: Nov. 10, 2026

(54) NETWORK ASSISTED DETECT AND AVOID SYSTEMS FOR AERIAL VEHICLES

(71) Applicant: QUALCOMM INCORPORATED, San Diego, CA (US)

(72) Inventors: Drew Foster Van Duren, Templeton, CA (US); Stefano Faccin, San Ysidro, CA (US); Sunghoon Kim, San Diego, CA (US); Kefeng Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/859,139

(22) PCT Filed: Jun. 16, 2022

(86) PCT No.: PCT/CN2022/099113
§ 371 (c)(1),
(2) Date: Oct. 22, 2024

(87) PCT Pub. No.: WO2023/240525
PCT Pub. Date: Dec. 21, 2023

(65) Prior Publication Data
US 2025/0279009 A1 Sep. 4, 2025

(51) Int. Cl.
*G08G 5/80* (2025.01)
*G08G 5/25* (2025.01)

(52) U.S. Cl.
CPC ................ *G08G 5/80* (2025.01); *G08G 5/25* (2025.01)

(58) Field of Classification Search
CPC .. G08G 5/80; G08G 5/25; G08G 5/57; G08G 5/26; G08G 5/22; G08G 5/53; G08G 5/55; G08G 5/56; G08G 5/727; H04W 88/08; H04B 7/18502
See application file for complete search history.

(56) References Cited

U.S. PATENT DOCUMENTS

2019/0154840 A1* 5/2019 Ferguson ................ G01S 19/28
2021/0065566 A1* 3/2021 Li .......................... H04W 4/023
2024/0388356 A1* 11/2024 Mäder ................ H04B 7/18506

FOREIGN PATENT DOCUMENTS

CN 112334964 A 2/2021
WO WO-2021201943 10/2021

OTHER PUBLICATIONS

International Search Report and Written Opinion—PCT/CN2022/099113—ISA/EPO—Dec. 22, 2022.

(Continued)

*Primary Examiner* — Ashley L Redhead, Jr.
(74) *Attorney, Agent, or Firm* — Holland & Hart LLP

(57) ABSTRACT

Methods, systems, and devices for wireless communications are described. The described techniques provide for an aircraft communicating with a detect and avoid (DAA) server. The aircraft may operate in an autonomous mode. The aircraft may transmit information associated with the aircraft to the server, and the server may respond with situational information to trigger a situational response by the aircraft while the aircraft operates in a zone associated with the server. The server may communicate with unmanned aircraft service suppliers (USSs) to support DAA techniques for the aircraft by communicating (e.g., transmitting or receiving) information associated with the aircraft.

31 Claims, 15 Drawing Sheets

(56) References Cited

OTHER PUBLICATIONS

Qualcomm Incorporated: "New Solution for KI#2 and KI#3: U2X for Support of Broadcast Remote ID and Direct DAA via PC5", 3GPP SA WG2 Meeting #150E, S2-2202379, Elbonia, Apr. 6-12, 2022, 6 Pages, The whole document.

* cited by examiner

NETWORK ASSISTED DETECT AND AVOID SYSTEMS FOR AERIAL VEHICLES

CROSS REFERENCE

The present Application is a 371 national stage filing of International PCT Application No. PCT/CN2022/099113 by Van Duren et al. entitled "NETWORK ASSISTED DETECT AND AVOID SYSTEMS FOR AERIAL VEHICLES," filed Jun. 16, 2022, which is assigned to the assignee hereof, and which is expressly incorporated by reference in its entirety herein.

FIELD OF TECHNOLOGY

The following relates to wireless communications, including network assisted detect and avoid systems for aerial vehicles.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Unmanned aerial vehicles (UAVs) may implement detect and avoid (DAA) systems and techniques that support collision or conflict avoidance. In some jurisdictions, these DAA systems are required for flight operations that do not have human observers or may lack ground-based observation systems along a flight path. DAA regulations for UAVs are being written, but current solutions rely on a remote human pilot and/or solely on on-board sensors and aerial awareness of surrounding traffic.

SUMMARY

The described techniques relate to improved methods, systems, devices, and apparatuses that support network assisted detect and avoid systems for aerial vehicles. For example, the described techniques provide for an aircraft communicating with a detect and avoid (DAA) server. The aircraft may transmit information associated with the aircraft, and the server may respond with situational information to trigger a situational response by the aircraft. The server may communicate with unmanned aircraft service suppliers (USSs) to support DAA techniques for the aircraft.

A method for wireless communications at a server is described. The method may include receiving, via a radio access network and from an aircraft, first information associated with the aircraft, transmitting, to the aircraft in response to receiving the first information, situational information to trigger a situational response by the aircraft while the aircraft operates in a zone associated with the server, and communicating, between the server and an unmanned aircraft service supplier, second information associated with the aircraft, the communicating being via a network function and based on receiving the first information.

An apparatus for wireless communications at a server is described. The apparatus may include a processor, memory coupled with the processor, and instructions stored in the memory. The instructions may be executable by the processor to cause the apparatus to receive, via a radio access network and from an aircraft, first information associated with the aircraft, transmit, to the aircraft in response to receiving the first information, situational information to trigger a situational response by the aircraft while the aircraft operates in a zone associated with the server, and communicate, between the server and an unmanned aircraft service supplier, second information associated with the aircraft, the communicating being via a network function and based on receiving the first information.

Another apparatus for wireless communications at a server is described. The apparatus may include means for receiving, via a radio access network and from an aircraft, first information associated with the aircraft, means for transmitting, to the aircraft in response to receiving the first information, situational information to trigger a situational response by the aircraft while the aircraft operates in a zone associated with the server, and means for communicating, between the server and an unmanned aircraft service supplier, second information associated with the aircraft, the communicating being via a network function and based on receiving the first information.

A non-transitory computer-readable medium storing code for wireless communications at a server is described. The code may include instructions executable by a processor to receive, via a radio access network and from an aircraft, first information associated with the aircraft, transmit, to the aircraft in response to receiving the first information, situational information to trigger a situational response by the aircraft while the aircraft operates in a zone associated with the server, and communicate, between the server and an unmanned aircraft service supplier, second information associated with the aircraft, the communicating being via a network function and based on receiving the first information.

In some examples of the method, apparatuses, and non-transitory computer-readable medium described herein, transmitting the situational information may include operations, features, means, or instructions for transmitting a warning indicative of a potential conflict associated with the aircraft.

In some examples of the method, apparatuses, and non-transitory computer-readable medium described herein, transmitting the situational information may include operations, features, means, or instructions for transmitting an indication of an avoidance instruction for avoiding a potential conflict by the aircraft.

In some examples of the method, apparatuses, and non-transitory computer-readable medium described herein, transmitting the situational information may include operations, features, means, or instructions for transmitting neighboring vehicle information associated with one or more vehicles operating in the zone or another proximal zone.

In some examples of the method, apparatuses, and non-transitory computer-readable medium described herein, transmitting the situational information may include operations, features, means, or instructions for transmit topographical information, ground-based obstruction information, or both associated with the zone or another proximal zone.

In some examples of the method, apparatuses, and non-transitory computer-readable medium described herein, receiving the first information may include operations, features, means, or instructions for receiving a deconfliction request or conflict warning associated with a potential conflict detected by the aircraft, where situational information may be transmitted based on receiving the deconfliction request or the conflict warning and includes an avoidance instruction.

In some examples of the method, apparatuses, and non-transitory computer-readable medium described herein, receiving the first information may include operations, features, means, or instructions for receiving metadata associated with the aircraft, where the metadata includes an aircraft type, an aircraft capability, an aircraft position, an aircraft velocity, an aircraft identity, aircraft operator information, or a combination thereof.

Some examples of the method, apparatuses, and non-transitory computer-readable medium described herein may further include operations, features, means, or instructions for receiving, from the aircraft, third information associated with one or more vehicles detected by the aircraft.

In some examples of the method, apparatuses, and non-transitory computer-readable medium described herein, the one or more vehicles include a piloted aircraft, an aircraft operating in the autonomous flying mode, a ground vehicle, or a combination thereof.

In some examples of the method, apparatuses, and non-transitory computer-readable medium described herein, communicating the second information may include operations, features, means, or instructions for transmitting, to the unmanned aircraft service supplier, an indication of conflict information associated with the aircraft, an indication of vehicle congestion information of the zone, or a combination thereof.

In some examples of the method, apparatuses, and non-transitory computer-readable medium described herein, communicating the second information may include operations, features, means, or instructions for transmitting, to the unmanned aircraft service supplier, a request for the second information associated with the aircraft and receiving, from the unmanned aircraft service supplier, in response to transmitting the request, the second information.

Some examples of the method, apparatuses, and non-transitory computer-readable medium described herein may further include operations, features, means, or instructions for determining, based on receiving the first information, that a potential conflict exists for the aircraft, a second aircraft, or both and transmitting, to the aircraft, the second aircraft, or both, an indication of the potential conflict.

Some examples of the method, apparatuses, and non-transitory computer-readable medium described herein may further include operations, features, means, or instructions for receiving, from one or more sensors associated with the server, zone information associated with the zone, where the situational information may be based on the zone information.

In some examples of the method, apparatuses, and non-transitory computer-readable medium described herein, the one or more sensors include a detect and avoid broadcast receiver, a broadcast remote identifier receiver, an automatic dependent surveillance-broadcast receiver, a weather sensor, a radar, a new-radio sensor, a lidar, an aircraft transponder, or a combination thereof.

In some examples of the method, apparatuses, and non-transitory computer-readable medium described herein, the server communicates with the aircraft via an access link, a sidelink, or both.

A method for wireless communications a first aircraft is described. The method may include receiving first information associated with one or more second vehicles, transmitting, to a server operating in a radio access network and based on receiving the first information associated with the one or more second vehicles, second information associated with the first aircraft, and receiving, from the server based on transmitting the second information, situational information to trigger a situational response by the first aircraft while the first aircraft operates in a zone associated with the server.

An apparatus for wireless communications a first aircraft is described. The apparatus may include a processor, memory coupled with the processor, and instructions stored in the memory. The instructions may be executable by the processor to cause the apparatus to receive first information associated with one or more second vehicles, transmit, to a server operating in a radio access network and based on receiving the first information associated with the one or more second vehicles, second information associated with the first aircraft, and receive, from the server based on transmitting the second information, situational information to trigger a situational response by the first aircraft while the first aircraft operates in a zone associated with the server.

Another apparatus for wireless communications a first aircraft is described. The apparatus may include means for receiving first information associated with one or more second vehicles, means for transmitting, to a server operating in a radio access network and based on receiving the first information associated with the one or more second vehicles, second information associated with the first aircraft, and means for receiving, from the server based on transmitting the second information, situational information to trigger a situational response by the first aircraft while the first aircraft operates in a zone associated with the server.

A non-transitory computer-readable medium storing code for wireless communications a first aircraft is described. The code may include instructions executable by a processor to receive first information associated with one or more second vehicles, transmit, to a server operating in a radio access network and based on receiving the first information associated with the one or more second vehicles, second information associated with the first aircraft, and receive, from the server based on transmitting the second information, situational information to trigger a situational response by the first aircraft while the first aircraft operates in a zone associated with the server.

In some examples of the method, apparatuses, and non-transitory computer-readable medium described herein, receiving the situational information may include operations, features, means, or instructions for receiving a warning indicative of a potential conflict associated with the first aircraft.

In some examples of the method, apparatuses, and non-transitory computer-readable medium described herein, receiving the situational information may include operations, features, means, or instructions for receiving an indication of an avoidance instruction for avoiding a potential conflict by the first aircraft.

In some examples of the method, apparatuses, and non-transitory computer-readable medium described herein, receiving the situational information may include operations, features, means, or instructions for receiving information associated with one or more vehicles operating in the zone or another proximal zone.

In some examples of the method, apparatuses, and non-transitory computer-readable medium described herein, receiving the situational information may include operations, features, means, or instructions for receive topographical information, ground-based obstruction information, or both associated with the zone or another proximal zone.

In some examples of the method, apparatuses, and non-transitory computer-readable medium described herein, transmitting the second information may include operations, features, means, or instructions for transmitting deconfliction request or conflict warning associated with a potential conflict detected by the first aircraft, where situational information may be received based on transmitting the deconfliction request or the conflict warning and includes an avoidance instruction.

In some examples of the method, apparatuses, and non-transitory computer-readable medium described herein, transmitting the second information may include operations, features, means, or instructions for transmitting metadata associated with the first aircraft, where the metadata includes an aircraft type, an aircraft capability, an aircraft position, an aircraft velocity, an aircraft identity, aircraft operator information, or a combination thereof.

Some examples of the method, apparatuses, and non-transitory computer-readable medium described herein may further include operations, features, means, or instructions for transmitting, to the server, an indication of the first information associated with one or more vehicles received by the first aircraft.

In some examples of the method, apparatuses, and non-transitory computer-readable medium described herein, the one or more second vehicles include a piloted aircraft, an aircraft operating in an autonomous flying mode, a ground vehicle, or a combination thereof.

In some examples of the method, apparatuses, and non-transitory computer-readable medium described herein, the first aircraft communicates with the server via an access link, a sidelink, or both.

Some examples of the method, apparatuses, and non-transitory computer-readable medium described herein may further include operations, features, means, or instructions for receiving, from an unmanned aircraft service supplier, an indication of reachability information for the server, an indication of the zone associated with the server, or both, where the first aircraft communicates with the server based on receiving the reachability information, the indication of the zone, or both.

A method for communications at a first unmanned aircraft service supplier is described. The method may include receiving, from a discovery and synchronization service, information associated with a second unmanned aircraft service supplier, receiving, from the second unmanned aircraft service supplier based on receiving the information, detect and avoid service area entity information associated with one or more detect and avoid servers managed by the second unmanned aircraft service supplier, and transmitting, to an aircraft, an indication of the detect and avoid service area entity information that the aircraft is use.

An apparatus for communications at a first unmanned aircraft service supplier is described. The apparatus may include a processor, memory coupled with the processor, and instructions stored in the memory. The instructions may be executable by the processor to cause the apparatus to receive, from a discovery and synchronization service, information associated with a second unmanned aircraft service supplier, receive, from the second unmanned aircraft service supplier based on receiving the information, detect and avoid service area entity information associated with one or more detect and avoid servers managed by the second unmanned aircraft service supplier, and transmit, to an aircraft, an indication of the detect and avoid service area entity information that the aircraft is use.

Another apparatus for communications at a first unmanned aircraft service supplier is described. The apparatus may include means for receiving, from a discovery and synchronization service, information associated with a second unmanned aircraft service supplier, means for receiving, from the second unmanned aircraft service supplier based on receiving the information, detect and avoid service area entity information associated with one or more detect and avoid servers managed by the second unmanned aircraft service supplier, and means for transmitting, to an aircraft, an indication of the detect and avoid service area entity information that the aircraft is use.

A non-transitory computer-readable medium storing code for communications at a first unmanned aircraft service supplier is described. The code may include instructions executable by a processor to receive, from a discovery and synchronization service, information associated with a second unmanned aircraft service supplier, receive, from the second unmanned aircraft service supplier based on receiving the information, detect and avoid service area entity information associated with one or more detect and avoid servers managed by the second unmanned aircraft service supplier, and transmit, to an aircraft, an indication of the detect and avoid service area entity information that the aircraft is use.

In some examples of the method, apparatuses, and non-transitory computer-readable medium described herein, receiving the information associated with the second unmanned aircraft service supplier may include operations, features, means, or instructions for receiving an indication of reachability information for the one or more detected and avoid servers, a location of the one or more detect avoid servers, a zone identifier associated with the one or more detect and avoid servers, or a combination thereof.

Some examples of the method, apparatuses, and non-transitory computer-readable medium described herein may further include operations, features, means, or instructions for transmitting, to the second unmanned aircraft service supplier in response to receiving the information, a request for the detect and avoid service area entity information, where the detect and avoid service area entity information may be received based on transmitting the request

DETAILED DESCRIPTION

Aircrafts, such as unmanned aerial vehicles (UAVs), drones, auto-pilot assisted aircrafts, and the like, may operate in autonomous modes. The aircrafts may implement detect and avoid (DAA) systems and techniques that support traffic separation, collision or conflict avoidance. In some jurisdictions, these DAA systems are required for flight operations that do not have human observers or ground-based observation systems along a flight path. DAA regulations for UAVs are being written, but current solutions rely on a remote human pilot and/or solely on on-board sensors and aerial awareness of surrounding traffic.

Techniques described herein support ground-based network infrastructure to support DAA systems in unmanned or autonomously operating aircraft operations. To support DAA systems, a server/node (which may be referred to as a local detect and avoid server (LDS)) tailored for DAA is positioned in a radio access network. The server is configured to wirelessly communicate with aircraft and to communicate information with an unmanned aircraft service supplier (USS). The server may receive information from an aircraft, and the information may include aircraft information (e.g., identifiers, capabilities, other detected aircraft, position/velocity vectors). The server may also transmit situational information to the aircraft, and the situational information may include general information such as other aircraft identifiers or collision avoidance requests/directives, and the situational information may trigger a situational response by the aircraft. The server may communicate congestion or conflict information to the USS and receive information about the aircraft from the USS. The information received from the unmanned aircraft service supplier may include aircraft category (the category of aircraft that is in communication with the LDS server), aircraft attributes, and/or mission type (the type of flight plan or indicated intent of the aircraft that is in communication with the LDS server). The server may also communicate with various ground based sensors to further support DAA systems. These and other techniques are described in further detail with respect to the figures.

Aspects of the disclosure are initially described in the context of wireless communications systems. Aspects of the disclosure are further described with respect to a wireless communications system illustrating example communications between a aircraft, a server, and a USS to support DAA techniques, an operating environment illustrating communications for DAA service discovery and configuration, and a process flow. Aspects of the disclosure are further illustrated by and described with reference to apparatus diagrams, system diagrams, and flowcharts that relate to network assisted detect and avoid systems for aerial vehicles.

Figure 1:
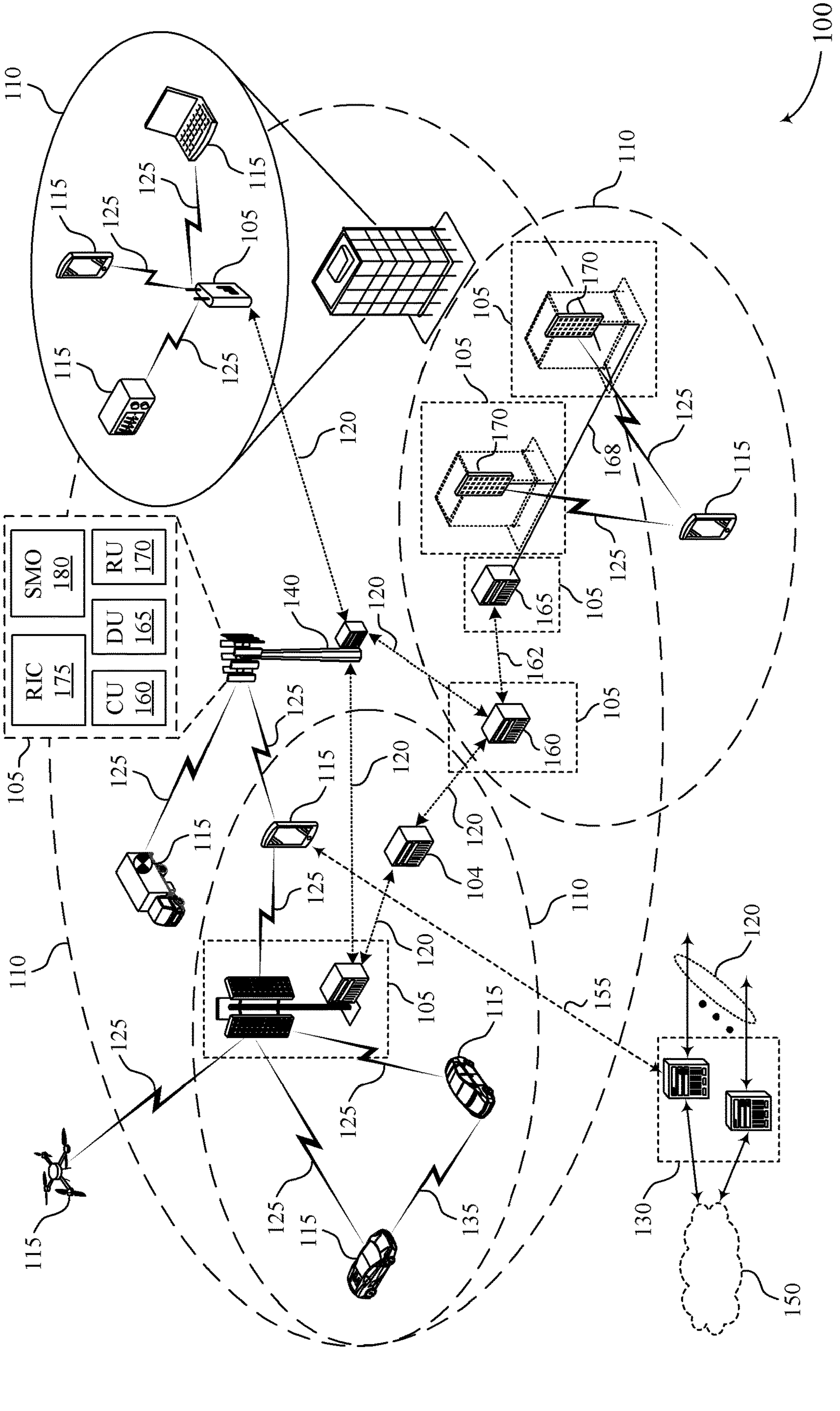
FIG. 1 illustrates an example of a wireless communications system that supports network assisted detect and avoid systems for aerial vehicles in accordance with one or more aspects of the present disclosure.

FIG. 1 illustrates an example of a wireless communications system 100 that supports network assisted detect and avoid systems for aerial vehicles in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support network assisted detect and avoid systems for aerial vehicles as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, the wireless communications system 100 may support communications with aircrafts operating in the vicinity of network entities 105, coverage areas 110, and/or UEs 115. Some aircraft may implement DAA systems to support collision or conflict avoidance, and these systems may rely on human observers, ground-based observations systems, remote human pilots, and/or on-board systems.

Techniques described herein support aircraft DAA systems using ground-based network infrastructure. For example, a server (e.g., a local DAA server) may be positioned in the wireless communications system 100 to support DAA systems at aircraft operating in the wireless communications system 100. The server may be part of or operate in conjunction with a network entity 105 for communications with aircraft, which may implement or function as a UE 115, as described herein. The server may receive information (e.g., via a radio access network (RAT)) from an aircraft that is operating in an autonomous flying mode. The information may be associated with the aircraft and may include general awareness of other aircraft, a potential conflict identified by the aircraft and/or metadata associated with the aircraft. The metadata may include an aircraft type, capability, position, velocity, identify, operator information, or a combination thereof.

In response to receiving the information for the aircraft, the server may transmit situational information to the aircraft. The situational information may include a warning of a potential conflict, an avoidance instructions, and/or neighboring vehicle information for vehicles operating in the zone or in another proximal zone. The server may identify such information in response to receiving the information from the aircraft. In some examples, the server may communicate information associated with an aircraft with a USS via a network function. For example, the server may retrieve publicly available information (e.g., flight plan, mission type, operator information) from the USS to support the DAA systems at the aircraft or the server. The server may also communicate with various sensors to support DAA systems. As such, techniques described herein may utilize aspects of the wireless communications systems 100 to support DAA techniques in aircraft, thereby improving aircraft safety and reliability.

Figure 2:
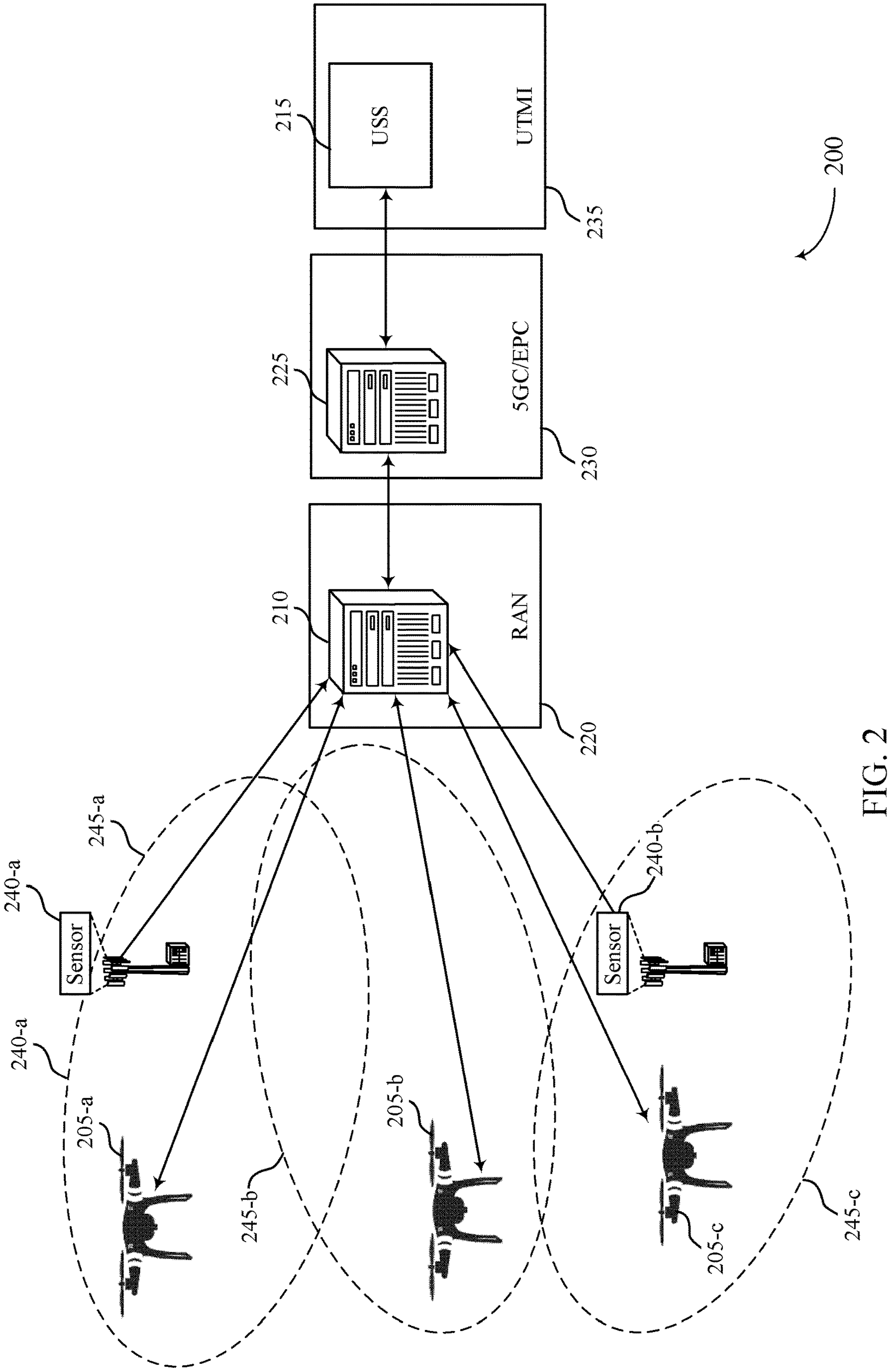
FIG. 2 illustrates an example of a wireless communications system that supports network assisted detect and avoid systems for aerial vehicles in accordance with one or more aspects of the present disclosure.

FIG. 2 illustrates an example of a wireless communications system 200 that supports network assisted detect and avoid systems for aerial vehicles in accordance with one or more aspects of the present disclosure. The wireless communications system 200 includes aircrafts 205, a server 210, and a USS 215. The aircrafts 205 may be examples of aircrafts that operate in an autonomous flying mode as described herein. For example, the aircraft 205 may be UAVs, drones, remote piloted aircrafts, piloted aircrafts, or the like. In the case of remote piloted or piloted aircrafts, the aircrafts 205 may operate in an autonomous mode, such as by using an autopilot feature.

The aircrafts 205 may be implemented with DAA systems (or sense and avoid (SAA) systems) which may allow UAVs and drones to integrate into civilian airspace by avoiding collisions with other aircrafts, buildings, power lines, birds, and other obstacles. These systems are configured to observe an environment surrounding the aircraft 205, determine whether a collision is imminent, and generate a new flight path in order to avoid a collision. UAV DAA/SAA systems may combine data from a number of sensors, using sensor fusion algorithms, image recognition, and artificial intelligence to support collision avoidance. Data may be fed back to the drone on-board computer and/or drone flight controller, which can then decide on a evasive maneuver or flight path correction to avoid collision. In some jurisdictions, a reliable onboard DAA system may be a prerequisite for obtaining an authorization or waiver for flight operations, which may typically require human observers or ground-based observation systems in the vicinity of the flight path. DAA systems may thus support commercially viable beyond visual line of sight (BVLOS) drone operations that provide services such as inspection and cargo delivery beyond the visual range of the operator or observers.

Some DAA solutions may be active or passive solutions that use sensor data. Passive solutions may use electro-optical data (e.g., cameras), passive radar and acoustic data. Active solutions may use sonar, lidar, and/or active radar. Some solutions may also be communications based. For example, UAVs may use systems designed for manned aviation, such as traffic collision and avoidance systems (TCAS) and/or automatic dependent surveillance-broadcast (ADS-B) systems that periodically broadcast and receive identity data, position data, and other information. Some standards may define DAA requirements based on airborne collision avoidance systems (ACAS). For UAS, three versions of ACAS are defined or are in development: (1) ACAS-Xu for fixed winged UAS; (2) ACAX-Xr-ACAS Xu adapted for rotocraft; and (3) ACAS-xXu for small UAS.

Techniques described herein support DAA without or with limited reliance on a remote pilot station (RPS), a UAV controller, a ground control station (GCS), and/or a human pilot. The techniques described herein may support DAA for automation techniques in aerial vehicles (aircraft 205) but without sole reliance on aerial vehicle awareness of surrounding traffic using onboard sensor information. The techniques described herein may also assume U2U communications to collect traffic awareness information (e.g., ACAS sXu). These techniques are supported by using ground-based network for higher spatial awareness of traffic and other conditions.

To support ground-based awareness, the server 210 may be implemented in the wireless communications system 200 as a localized USS/UTM node configured for DAA. The server 210 may be implemented in RAN 220. For example, the server 210 may be configured as or implemented with a network entity 105, as described with respect to FIG. 1. The server 210 may support artificial intelligence and/or machine learning techniques for traffic and/or condition awareness and forecasting at the aircraft 205. In some examples, the server 210 provides a subscription-based traffic separation service, such that various aircraft 205 may subscribe to the services provided by the server 210. The server 210 may be configured to support spatial awareness based on information collected from various vehicles (e.g., aircraft 205), such as UAVs, and from other devices such as network entities 105 and other sources of information. The server 210 may implement traffic separation algorithms and collision notification features across one or more cells. A particular aircraft 205 may be visible to multiple servers 210.

Additionally, to support DAA systems at the aircraft 205, the server 210 may interact with and leverage a network data analytics function (NWDAF) and a network exposure function (NEF) (e.g., unmanned arial systems network function (UAS NF) 225) to interact with unmanned aircraft system traffic management (UTM) systems and USSs (e.g., USS 215). The NWDAF and the NEF may provide access to network services and capabilities via a network (e.g., a 5G core network 230). The 5G core network 230 may be an example of core network 130 of FIG. 1. As described in further detail herein, the server 210 may provide, via a NEF (e.g., UAS NF 225), aerial congestion information and aircraft 205 information to the USS 215 to support in flight authorization.

USSs (e.g., USS 215) may offer services to support efficient and safe utilization of civilian airspace by unmanned aerial systems (e.g., aircraft 205). The USS 215 may be an example of or used to support IP services 150 of FIG. 1. The USS 215 be an example of aspects of unmanned aircraft system traffic management infrastructure (UTMI) 235. The USS 215 may function as communication endpoint between aircraft (e.g., aircraft 205) and authorities. The USS may support tools for traffic management, flight planning, operational data, and the like. Aspects of the UTMI 235, such as the USS 215, may be accessible by RAN 220 services (e.g., the server 210) via a NEF, such as the UAS NF 225.

As an aircraft, such as aircraft 205-*a*, enters a zone or airspace associated with the server 210, then the communications between the aircraft 205-*a* and the server 210 may be initiated by the aircraft 205-*a* and or server 210. For example, the aircraft 205-*a* may transmit first information associated with the aircraft 205-*a* to the server 210 via the RAN 220. The first information may include metadata associated with the aircraft 205-*a*, such as an aircraft type, aircraft capability, an aircraft position, an aircraft velocity, an aircraft identify, operator information, or a combination thereof. The aircraft identity may be an example of a broadcast remote identifier (BRID) associated with the aircraft 205-*a*. In some examples, the first information associated with the aircraft 205-*a* that is transmitted to the server 210 may include neighboring vehicle information detected by the aircraft 205-*a*. For example, the aircraft 205-*a* may detect that aircraft 205-*b* and 205-*c* are operating nearby and indicate such information to the server 210. In some examples, the aircraft 205-*a* may receive identifiers (e.g., BRIDs) broadcast by the aircrafts 205-*b* and 205-*c* and transmit the identifiers to the server 210.

In some examples, the aircraft 205-*a* may detect a possible conflict with another aircraft 205 or another object such as a powerline, building, ground vehicle, etc. In such cases, the aircraft 205-*a* may transmit a deconfliction request or a conflict warning to the server 210. The deconfliction request or conflict warning may be associated with the potential conflict detected by the aircraft 205-*a*.

In response to receiving the first information associated with the aircraft 205-*a* and/or the deconfliction request or conflict warning, the server 210 may transmit situational information to the aircraft 205-*a*. The situational information may trigger a situational response (e.g., an evasive maneuver) by the aircraft 205-*a*. In some examples, the situation information may include an indication of an avoidance instruction for avoiding a conflict by the aircraft 205-*a*. For example, the avoidance instructions may include instructions for performing the evasive maneuver (e.g., ascend, descend, or turn). The situational information may also include a warning that is indicative of a potential conflict associated with the aircraft 205-*a*. The indication may include location information associated with the potential conflict. In such cases, the aircraft 205-*a* may determine the evasive maneuver to avoid the conflict. In some examples, the situational information includes neighboring vehicle information associated with vehicles operating in the zone (or another proximal zone) associated with the server 210.

As described herein, the server 210 may communicate with the USS 215 via a network function (e.g., UAS NF 225). The communication between the server 210 and the USS 215 may be performed in response to receiving the first information from the aircraft 205-*a*. In some cases, the server 210 and the USS 215 may communicate information associated with the aircraft 205-*a*. For example, the server 210 may transmit information associated with the aircraft, such an identifier of the aircraft 205-*a*, to the USS 215. In some examples, the server 210 may transmit congestion or conflict information for the zone associated with the server

210 to the USS 215 to support flight planning at the USS 215. For example, if the quantity of aircrafts in the zone associated with the server 210 is above—or anticipated to be above—a threshold, then the server 210 may transmit, to the USS 215, an indication of the number of aircrafts and/or an indication that the number of aircrafts is above or anticipated to be above the threshold. Additionally, or alternatively, the server 210 may request information associated with the aircraft from the USS 215. For example, the server 210 transmits an API request that includes an aircraft identifier associated with the aircraft 205-*a*. In response, the USS 215 may return information such as aircraft type or category, aircraft capability, operator information, mission type, or the like. This information may be used by the server 210 to determine spatial awareness information, situational information, or the like to be used by aircraft 205 in the area or zone associated with the server 210.

The server 210 may also use sensor data received from sensors 240 to support DAA techniques at aircraft 205-*a*. The sensors 240 may be collocated with the server 210 and/or positioned in a zone associated with the server 210. For example, a aircraft identity sensor, such as a BRID receiver, may be positioned in the zone and may receive or detect aircraft identifiers that are broadcast by the aircraft 205. The identifiers may be communicated to the server 210 to support DAA solutions as described herein. Thus, using the sensors 240 as BRID receivers, the server 210 may be able to identify aircraft 205 that are operating in the zone associated with the server 210. In some examples, identity broadcasts may be limited by a coverage area, such as BRID coverage areas 245. As such, positioning of sensors 240-*a* in the zone associated with the server 210 may support advanced aircraft identification. The sensors 240 may be positioned in conjunction with network entities (e.g., network entities 105 of FIG. 1) to support communications between the sensors 240 and the server 210. The sensors may also be DAA broadcast receivers, automatic dependent surveillance-broadcast (ADS-B) receivers, weather sensors, radar, NR sensors, lidar, or the like. For example, a weather sensor may sense wind data which may support DAA solutions. In some examples, the sensor data received from the sensors 240 may be communicated to the USS 215 (e.g., via UAS NF 225) to support flight planning, traffic planning and other solutions.

In one example use of the system described herein, the aircraft 205-*a* may detect a possible conflict situation (e.g., based on on-board sensors), and the aircraft 205-*a* may transmit an indication of the detected conflict to the server 210. In response to receiving the indication of the detected conflict, the server 210-*a* may collect data from the sensor 240-*a*. Using the collected data and the indication received from the aircraft 205-*a*, the server 210 may detect or identify a possible conflict situation. The server 210 may transmit a trigger warning to the aircraft 205-*b* and an emergency directive (e.g., evasive maneuver instructions) to the aircraft 205-*c*, which may trigger an evasive maneuver by the aircraft 205-*c*. As such, the server 210 is used to support DAA techniques at multiple aircraft 205 operating in a zone associated with the server.

Figure 3:
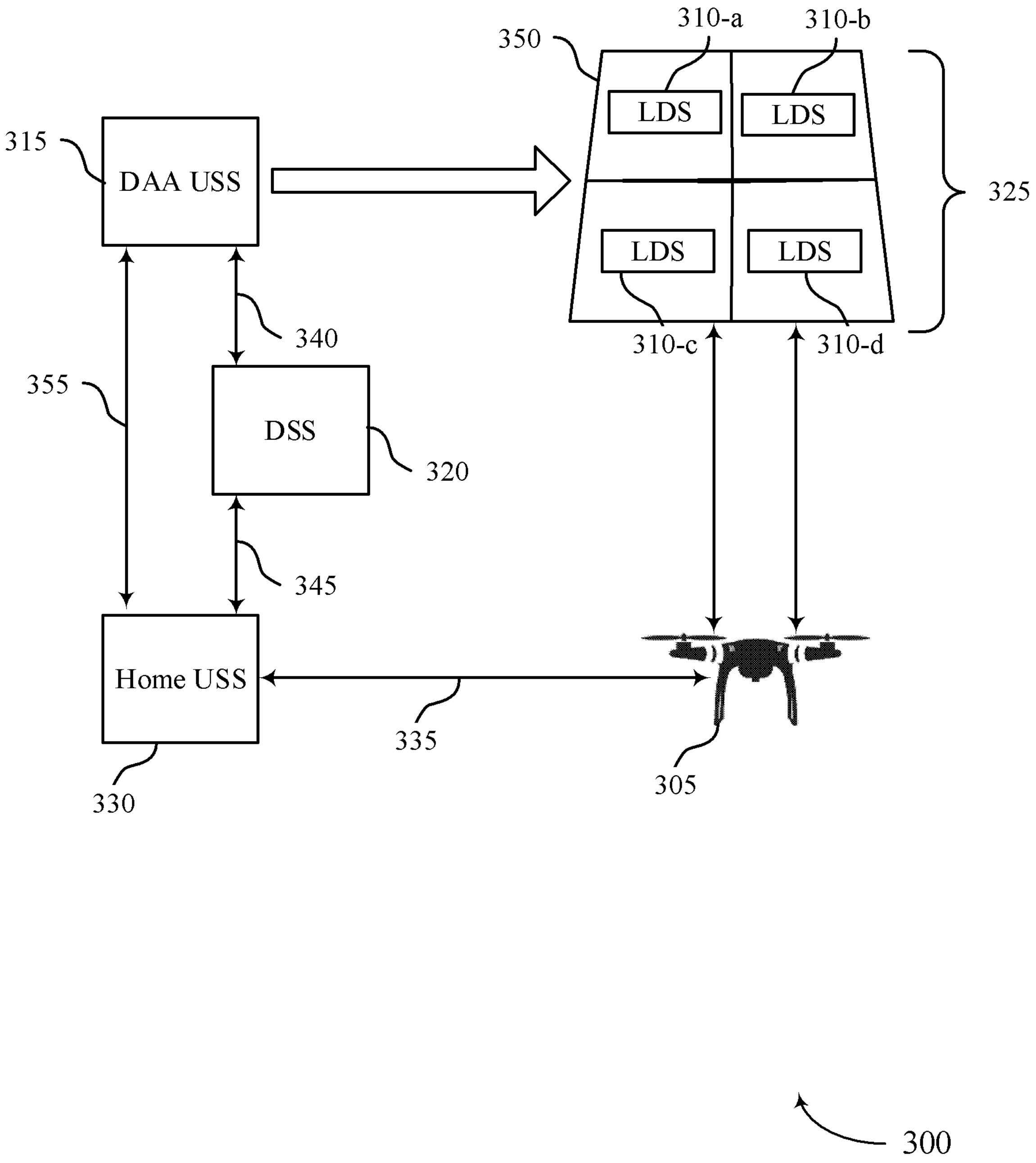
FIG. 3 illustrates an example of an operating environment that supports network assisted detect and avoid systems for aerial vehicles in accordance with one or more aspects of the present disclosure.

FIG. 3 illustrates an example of an operating environment 300 that supports network assisted detect and avoid systems for aerial vehicles in accordance with one or more aspects of the present disclosure. The operating environment includes an aircraft 305, a DAA USS 315, and a set of servers 310. The aircraft 305 may be an example of an aircraft 205 as described with respect to FIG. 2. The DAA USS 315 may be an example of a USS 315 as described with respect to FIG. 2. The operating environment 300 also includes a discovery and synchronizations service (DSS) 320 and a DAA service area 325 that includes a set of servers 310, which may be examples of the server 210 of FIG. 2. Each server 310 may support a different and/or overlapping portion of the DAA service area 325.

Some techniques support a DSS being used for USSs to discover each other in order to push/subscribe to entities of information that the respective USSs may provide. Techniques described herein leverage the DSS to support DAA service area discovery provisioning of such information for aircrafts. For example, a home USS 330 of the aircraft 305 may provide update updates on the DAA service area 325 topology and reachability (e.g., referred to as the DAA service area entity). Once the aircraft 305 has and maintains updates to the DAA service area entity, the aircraft 305 may have the geographic coverage areas (e.g., zones) of the current server 310 and reachability information (e.g., resource address, such as a URL) to support the DAA techniques described herein.

FIG. 3 illustrates example communications that are used to support DAA for aircraft 305 in the DAA service area 325. At 335, the aircraft 305, or a control station associated with the aircraft 305, may initiate and maintain a subscription to the local detect and avoid service via the home USS 330. Thus, the aircraft 305 may obtain and maintain data associated with DAA service areas and their local zones and respective servers 310, and the data may include and identification information to reach the local servers, such as uniform resource locator (URL) addresses. At 340, the DAA USS may register the DAA service to the DSS 320, and the DSS 320 may be configured with data associated with the DAA service area geography for reporting. At 345, the home USS 330 may discover and subscribe to the DAA service area 325 description entity (e.g., an instance of discoverable information). The description entity may include information associated with the DAA service area 325 as well as local zones (e.g., a zone 350). After subscribing to the DAA USS 315, the home USS 330 may receive the entity information and or any updates to such information from the DAA USS 315 via a direct protocol at 355 (e.g., without the use of the DSS 320).

With the information associated with the DAA service area 325 topology, the aircraft may initiate contact with and communicate with the servers 310. After initiation of communication, the communication protocol may support server 310 discovery such that the aircraft 305 may not have to continue subscribing via the home USS 330. In some examples, the aircraft 305 may receive information about another USS via an already subscribed USS (e.g., DAA USS 315), thereby bypassing the need for receiving DAA service information directly from the home USS 330.

As described herein, the DAA USS 315 may be a USS that manages one or more DAA service areas (e.g., service area 325), each subdivided into LDS local zones (e.g., a zone 350). Management of the DAA service area 325 may involve maintaining a database (e.g., local or remote) of zone descriptors (e.g., server 310 identifying information and location information), such as server identifiers and/or resource addresses (e.g., layer 2, IP, URI or application layer). A zone may be an example of a local zone that is supported by a server 310 for DAA techniques. More than one server 310 may be assigned to a zone. As described herein, the DSS 320 may be used to discover and maintain awareness of geographically-defined services and information sets (e.g., USSs). The home USS 330 may be used by the aircraft 305 to obtain the database of service area descriptions and may be used to maintain updates to the database. The aircraft 305 may communicate with the home USS 330 over a LDS discovery and subscription service protocol, which may be a proprietary protocol. The home USS 330 may also support an associated DAA service area. The servers 310 may be assigned/configured to a zone by a managing USS, such as USS 315.

Figure 4:
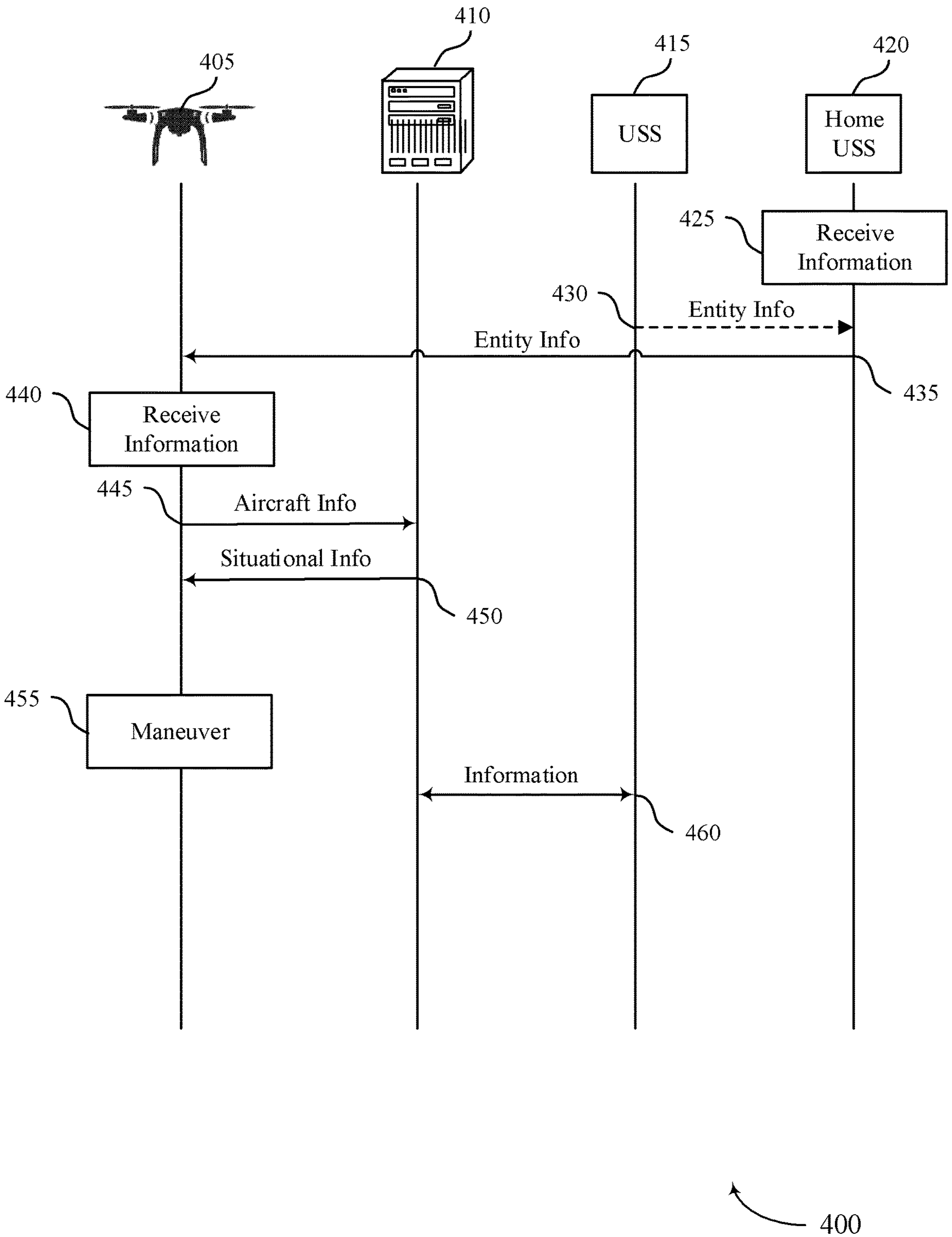
FIG. 4 illustrates an example of a process flow that supports network assisted detect and avoid systems for aerial vehicles in accordance with one or more aspects of the present disclosure.

FIG. 4 illustrates an example of a process flow 400 that supports network assisted detect and avoid systems for aerial vehicles in accordance with one or more aspects of the present disclosure. The process flow 400 includes an aircraft 405, a server 410, a USS 415, and a home USS 320, which may be an example of the corresponding devices as described with respect to FIGS. 1 through 3. The aircraft 405 may be subscribed to the home USS 420 in order to receive DAA entity information, among other information, to support DAA techniques as described herein. In some examples, some signaling or procedure of the process flow 400 may occur in different orders than shown. Additionally, or alternatively, some additional procedures of signaling may occur, or some signaling or procedures may not occur.

At 425, the home USS 420 may receive, from a DSS, information associated with a second USS (e.g., USS 415). The home USS 420 may receive the information in response to subscribing to the DSS. In some examples, receiving, the information for the second USS may include receiving and endpoint or identifier associated with the second USS.

At 430, the home USS 420 may receive, from the second USS 415 based at least in part on receiving the information associated with the second USS 415, detect and avoid service area entity information associated with one or more detect and avoid servers (e.g., server 410) managed by the second USS. In some examples, the home USS 420 may transmit, to the second USS 415 in response to receiving the information, a request for the detect and avoid service area entity information, and the detect and avoid service area entity information is received based at least in part on transmitting the request. The detect and avoid service area entity information may include an indication of an reachability information associated with the server (e.g., an address), such as a uniform resource locator (URL) address, a uniform resource identifier (URI), an IP address, or another endpoint identifier for the one or more detected and avoid servers, a location of the one or more detect avoid servers, a zone identifier associated with the one or more detect and avoid servers, or a combination thereof.

At 435, the home USS 320 may transmit, and the aircraft 405 may receive, an indication of the detect and avoid service area entity information that the aircraft is use while operating in an autonomous flying mode.

At 440, the aircraft 405 may receive first information associated with one or more second vehicles. The aircraft 405 is operating in an autonomous flying mode. The first information may be detected by the aircraft 405. In some examples, the first information may be aircraft identifiers associated with aircraft (e.g., second vehicles). In some examples, the second vehicles may be ground vehicles, other aircraft, piloted aircraft, and/or remote piloted aircraft.

At 445, the aircraft 405 may transmit, and the server 410 may receive, via a radio access network and from the aircraft 405 operating in an autonomous flying mode, information associated with the aircraft 405. The information may be an example of a deconfliction request or conflict warning associated with a potential conflict detected by the aircraft 405. The information may be metadata associated with the aircraft 405, and the metadata may include an aircraft type, an aircraft capability, an aircraft position, an aircraft velocity, an aircraft identity, aircraft operator information, or a combination thereof. The information may include information associated with other vehicles (e.g., neighboring aircraft) detected by the aircraft 405. In some examples, the server 410 may determine, based at least in part on receiving the first information, that a potential conflict exists for the aircraft, a second aircraft, or both.

At 450, the server 410 may transmit, and the aircraft 405 may receive, situational information to trigger a situational response by the aircraft 405 while the aircraft 405 operates in a zone associated with the server 410. The situational information may include an indication of a potential conflict associated with the aircraft 405, an indication of an avoidance instruction for avoiding a potential conflict by the aircraft 405, and/or neighboring vehicle information associated with one or more vehicles operating in the zone. The situational information may additionally or alternatively include topographical information associated with the zone, ground-based obstruction information associated with the zone, or both. For example, the information may indication locations of topographical obstructions (e.g., mountains) and/or obstructions (e.g., buildings or power lines). The situational information may also include information associated with proximal zones, such as zones that are adjacent to the zone in which the aircraft 405 is operating, zones that are nearby the aircraft, etc. The server 410 and the aircraft 405 may communicate via an access link (e.g., a Uu link), a sidelink (e.g., a PC5 interface), or both. The server 410 and the aircraft 405 may communicate via layer 2 (L2) or layer 3 (L3) protocols. In examples when the aircraft 405 receives avoidance instructions (e.g., deconfliction advice), the aircraft 405 may not execute on the instructions without input from a pilot (e.g., remote pilot or on-board pilot) or a ground station/controller.

At 455, the aircraft 405 may perform an evasive maneuver in response to receiving the situational information in order to avoid the aircraft. As described herein, the aircraft 405 may perform an evasive maneuver in response to receiving the situational information and input from a pilot or ground station/controller to perform the evasive maneuver.

At 460, the server 410 may communicate between the server 410 and the USS 415, second information associated with the aircraft 405. The communicating may be performed via a network function based at least in part on receiving the first information associated with the aircraft 405. For example, the server 410 may transmit, to the USS 415, an indication of conflict information associated with the aircraft, an indication of vehicle congestion information of the zone, or a combination thereof. The server 410 may also transmit, to the USS 415, a request for information associated with the aircraft 405, such as aircraft type and/or operator information that may be used to determine situational information to transmit to the aircraft 405. In some examples, the server 410 may receive from one or more sensors associated with the server, zone information associated with the zone, wherein the situational information is based at least in part on the zone information. The zone information may include other aircraft or vehicles detected by the sensors, weather information, ADS-B information, radar information, lidar information, or the like. The zone information may additionally include static or ephemeral ground-based obstacles such as structures, cranes, or topographical obstructions.

Figure 5:
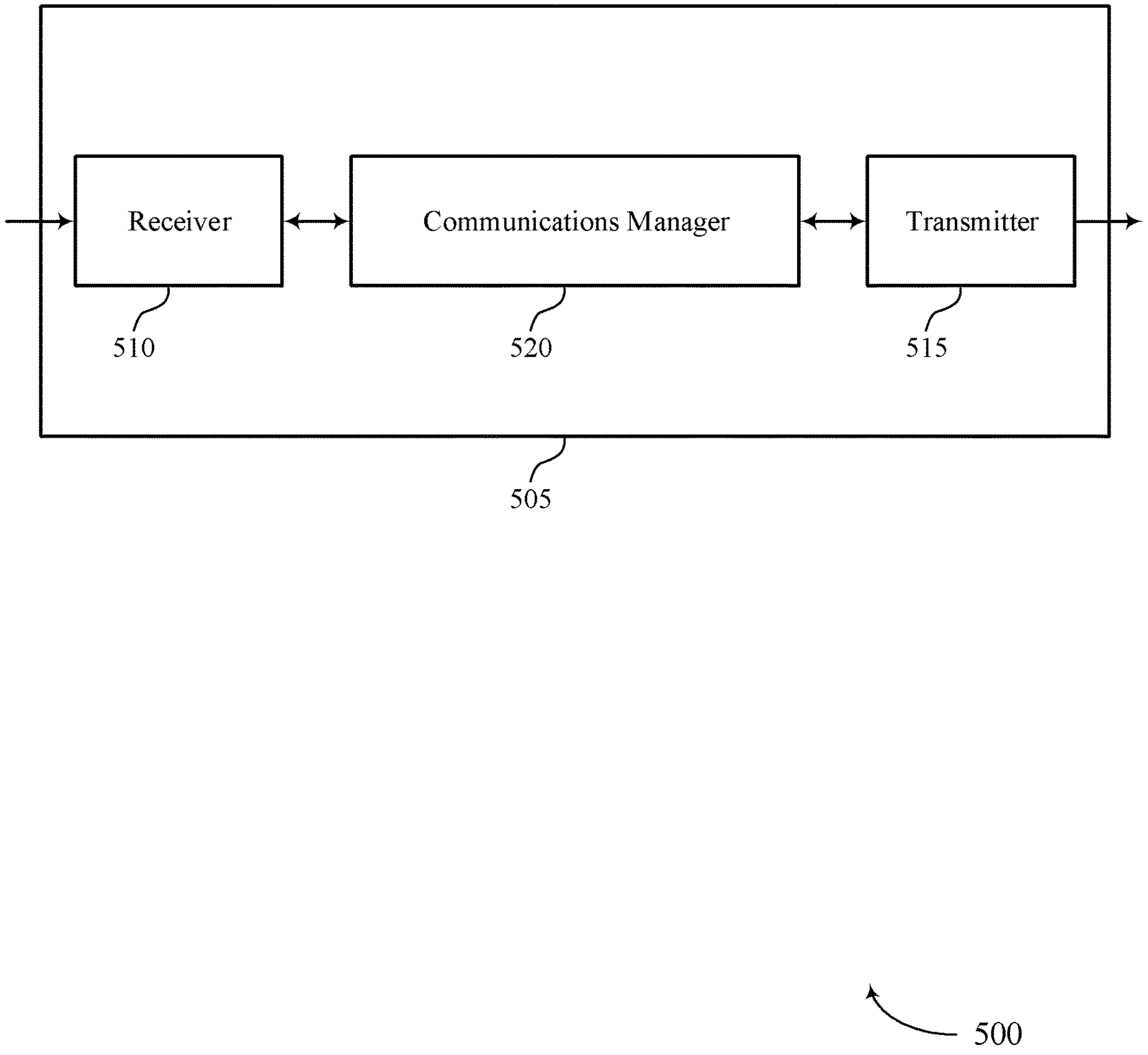
FIGS. 5 and 6 show block diagrams of devices that support network assisted detect and avoid systems for aerial vehicles in accordance with one or more aspects of the present disclosure.

FIG. 5 shows a block diagram 500 of a device 505 that supports network assisted detect and avoid systems for aerial vehicles in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of network assisted detect and avoid systems for aerial vehicles as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a server in accordance with examples as disclosed herein. For example, the communications manager 520 may be configured as or otherwise support a means for receiving, via a radio access network and from an aircraft, first information associated with the aircraft. The communications manager 520 may be configured as or otherwise support a means for transmitting, to the aircraft in response to receiving the first information, situational information to trigger a situational response by the aircraft while the aircraft operates in a zone associated with the server. The communications manager 520 may be configured as or otherwise support a means for communicating, between the server and an unmanned aircraft service supplier, second information associated with the aircraft, the communicating being via a network function and based on receiving the first information.

Additionally, or alternatively, the communications manager 520 may support communications at a first unmanned aircraft service supplier in accordance with examples as disclosed herein. For example, the communications manager 520 may be configured as or otherwise support a means for receiving, from a discovery and synchronization service, information associated with a second unmanned aircraft service supplier. The communications manager 520 may be configured as or otherwise support a means for receiving, from the second unmanned aircraft service supplier based on receiving the information, detect and avoid service area entity information associated with one or more detect and avoid servers managed by the second unmanned aircraft service supplier. The communications manager 520 may be configured as or otherwise support a means for transmitting, to an aircraft, an indication of the detect and avoid service area entity information that the aircraft is use while operating in an autonomous flying mode.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved aircraft safety and reliability by leveraging wireless communication networks to support DAA techniques.

Figure 6:
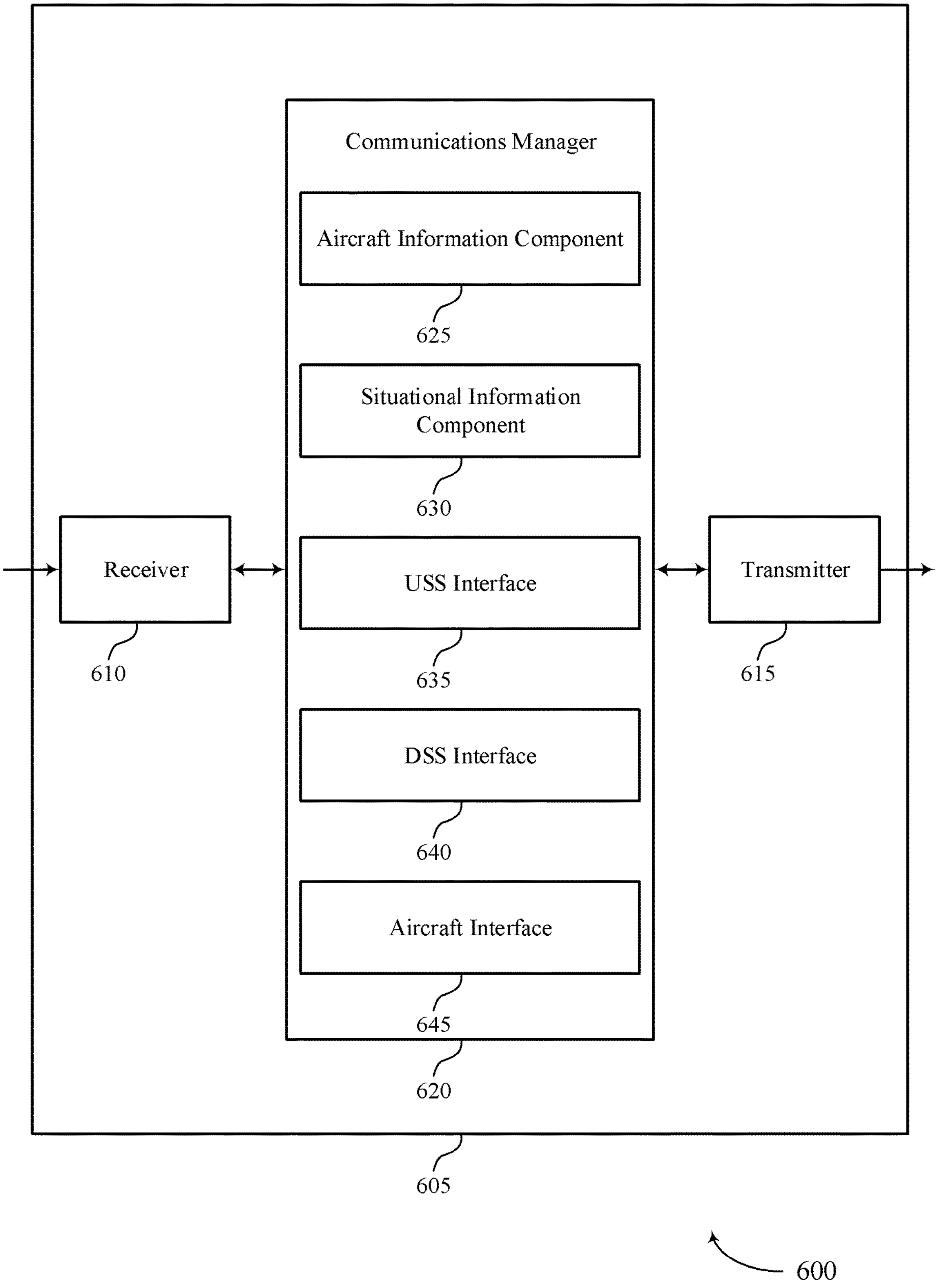

FIG. 6 shows a block diagram 600 of a device 605 that supports network assisted detect and avoid systems for aerial vehicles in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of network assisted detect and avoid systems for aerial vehicles as described herein. For example, the communications manager 620 may include an aircraft information component 625, a situational information component 630, an USS interface 635, a DSS interface 640, an aircraft interface 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a server in accordance with examples as disclosed herein. The aircraft information component 625 may be configured as or otherwise support a means for receiving, via a radio access network and from an aircraft, first information associated with the aircraft. The situational information component 630 may be configured as or otherwise support a means for transmitting, to the aircraft in response to receiving the first information, situational information to trigger a situational response by the aircraft while the aircraft operates in a zone associated with the server. The USS interface 635 may be configured as or otherwise support a means for communicating, between the server and an unmanned aircraft service supplier, second information associated with the aircraft, the communicating being via a network function and based on receiving the first information.

Additionally, or alternatively, the communications manager 620 may support communications at a first unmanned aircraft service supplier in accordance with examples as disclosed herein. The DSS interface 640 may be configured as or otherwise support a means for receiving, from a discovery and synchronization service, information associated with a second unmanned aircraft service supplier. The USS interface 635 may be configured as or otherwise support a means for receiving, from the second unmanned aircraft service supplier based on receiving the information, detect and avoid service area entity information associated with one or more detect and avoid servers managed by the second unmanned aircraft service supplier. The aircraft interface 645 may be configured as or otherwise support a means for transmitting, to an aircraft, an indication of the detect and avoid service area entity information that the aircraft can use while operating in an autonomous flying mode.

Figure 7:
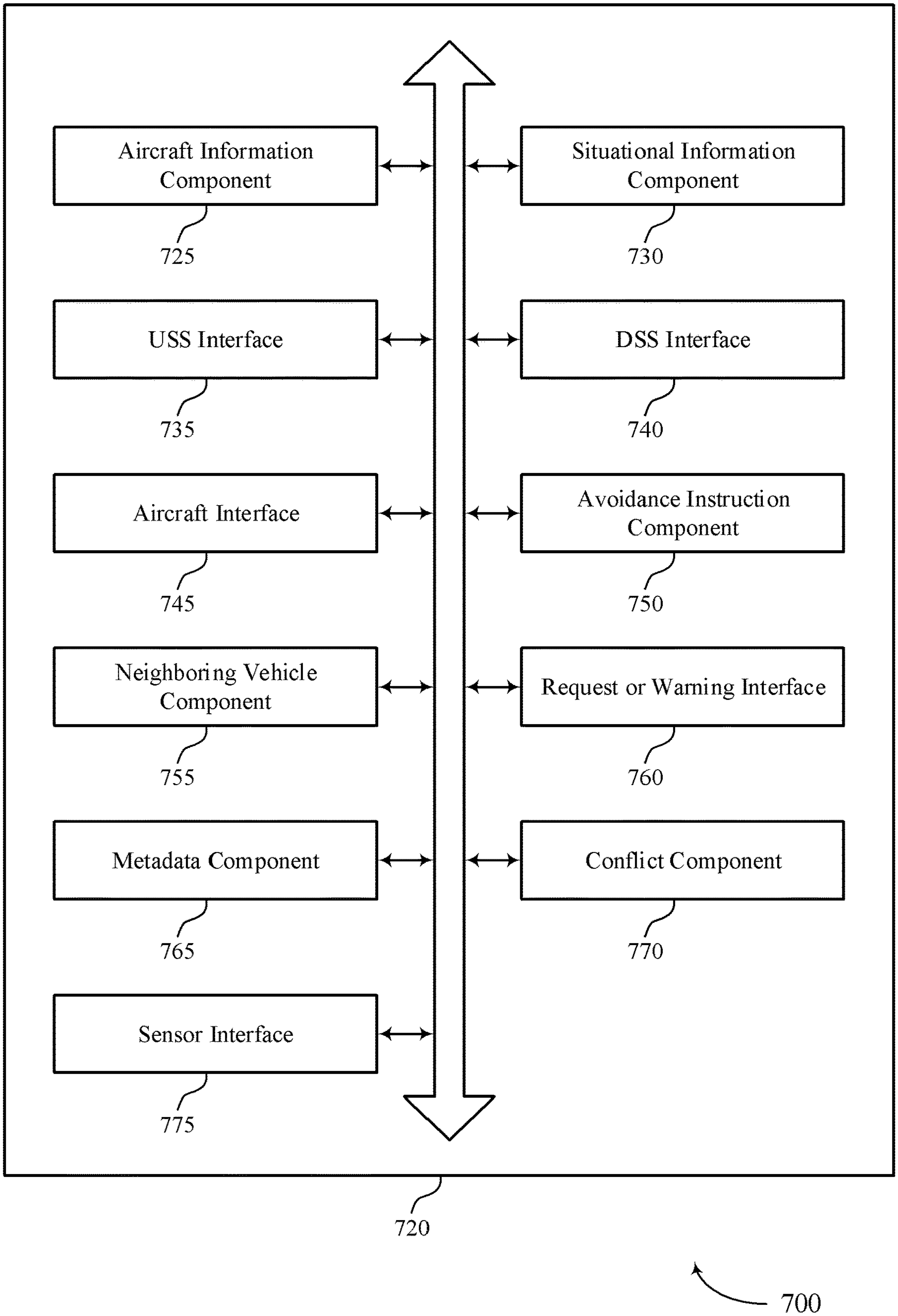
FIG. 7 shows a block diagram of a communications manager that supports network assisted detect and avoid systems for aerial vehicles in accordance with one or more aspects of the present disclosure.

FIG. 7 shows a block diagram 700 of a communications manager 720 that supports network assisted detect and avoid systems for aerial vehicles in accordance with one or more aspects of the present disclosure. The communications manager 720 may be an example of aspects of a communications manager 520, a communications manager 620, or both, as described herein. The communications manager 720, or various components thereof, may be an example of means for performing various aspects of network assisted detect and avoid systems for aerial vehicles as described herein. For example, the communications manager 720 may include an aircraft information component 725, a situational information component 730, an USS interface 735, a DSS interface 740, an aircraft interface 745, an avoidance instruction component 750, a neighboring vehicle component 755, a request or warning interface 760, a metadata component 765, a conflict component 770, a sensor interface 775, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a server in accordance with examples as disclosed herein. The aircraft information component 725 may be configured as or otherwise support a means for receiving, via a radio access network and from an aircraft, first information associated with the aircraft. The situational information component 730 may be configured as or otherwise support a means for transmitting, to the aircraft in response to receiving the first information, situational information to trigger a situational response by the aircraft while the aircraft operates in a zone associated with the server. The USS interface 735 may be configured as or otherwise support a means for communicating, between the server and an unmanned aircraft service supplier, second information associated with the aircraft, the communicating being via a network function and based on receiving the first information.

In some examples, to support transmitting the situational information, the situational information component 730 may be configured as or otherwise support a means for transmitting a warning indicative of a potential conflict associated with the aircraft.

In some examples, to support transmitting the situational information, the avoidance instruction component 750 may be configured as or otherwise support a means for transmitting an indication of an avoidance instruction for avoiding a potential conflict by the aircraft.

In some examples, to support transmitting the situational information, the neighboring vehicle component 755 may be configured as or otherwise support a means for transmitting neighboring vehicle information associated with one or more vehicles operating in the zone or another proximal zone.

In some examples, to support transmitting the situational information, the neighboring vehicle component 755 may be configured as or otherwise support a means for transmitting topographical information, ground-based obstruction information, or both associated with the zone or another proximal zone.

In some examples, to support receiving the first information, the request or warning interface 760 may be configured as or otherwise support a means for receiving a deconfliction request or conflict warning associated with a potential conflict detected by the aircraft, where situational information is transmitted based on receiving the deconfliction request or the conflict warning and includes an avoidance instruction.

In some examples, to support receiving the first information, the metadata component 765 may be configured as or otherwise support a means for receiving metadata associated with the aircraft, where the metadata includes an aircraft type, an aircraft capability, an aircraft position, an aircraft velocity, an aircraft identity, aircraft operator information, or a combination thereof.

In some examples, the aircraft information component 725 may be configured as or otherwise support a means for receiving, from the aircraft, third information associated with one or more vehicles detected by the aircraft.

In some examples, the one or more vehicles include a piloted aircraft, an aircraft operating in the autonomous flying mode, a ground vehicle, or a combination thereof.

In some examples, to support communicating the second information, the USS interface 735 may be configured as or otherwise support a means for transmitting, to the unmanned aircraft service supplier, an indication of conflict information associated with the aircraft, an indication of vehicle congestion information of the zone, or a combination thereof.

In some examples, to support communicating the second information, the USS interface 735 may be configured as or otherwise support a means for transmitting, to the unmanned aircraft service supplier, a request for the second information associated with the aircraft. In some examples, to support communicating the second information, the USS interface 735 may be configured as or otherwise support a means for receiving, from the unmanned aircraft service supplier, in response to transmitting the request, the second information.

In some examples, the conflict component 770 may be configured as or otherwise support a means for determining, based on receiving the first information, that a potential conflict exists for the aircraft, a second aircraft, or both. In some examples, the situational information component 730 may be configured as or otherwise support a means for transmitting, to the aircraft, the second aircraft, or both, an indication of the potential conflict.

In some examples, the sensor interface 775 may be configured as or otherwise support a means for receiving, from one or more sensors associated with the server, zone information associated with the zone, where the situational information is based on the zone information.

In some examples, the one or more sensors include a detect and avoid broadcast receiver, a broadcast remote identifier receiver, an automatic dependent surveillance-broadcast receiver, a weather sensor, a radar, a new-radio sensor, a lidar, an aircraft transponder, or a combination thereof.

In some examples, the server communicates with the aircraft via an access link, a sidelink, or both.

Additionally, or alternatively, the communications manager 720 may support communications at a first unmanned aircraft service supplier in accordance with examples as disclosed herein. The DSS interface 740 may be configured as or otherwise support a means for receiving, from a discovery and synchronization service, information associated with a second unmanned aircraft service supplier. In some examples, the USS interface 735 may be configured as or otherwise support a means for receiving, from the second unmanned aircraft service supplier based on receiving the information, detect and avoid service area entity information associated with one or more detect and avoid servers managed by the second unmanned aircraft service supplier. The aircraft interface 745 may be configured as or otherwise support a means for transmitting, to an aircraft, an indication of the detect and avoid service area entity information that the aircraft can use while operating in an autonomous flying mode.

In some examples, to support receiving the information associated with the second unmanned aircraft service supplier, the DSS interface 740 may be configured as or otherwise support a means for receiving an indication of reachability information for the one or more detected and avoid servers, a location of the one or more detect avoid servers, a zone identifier associated with the one or more detect and avoid servers, or a combination thereof.

In some examples, the USS interface 735 may be configured as or otherwise support a means for transmitting, to the second unmanned aircraft service supplier in response to receiving the information, a request for the detect and avoid service area entity information, where the detect and avoid service area entity information is received based on transmitting the request.

Figure 8:
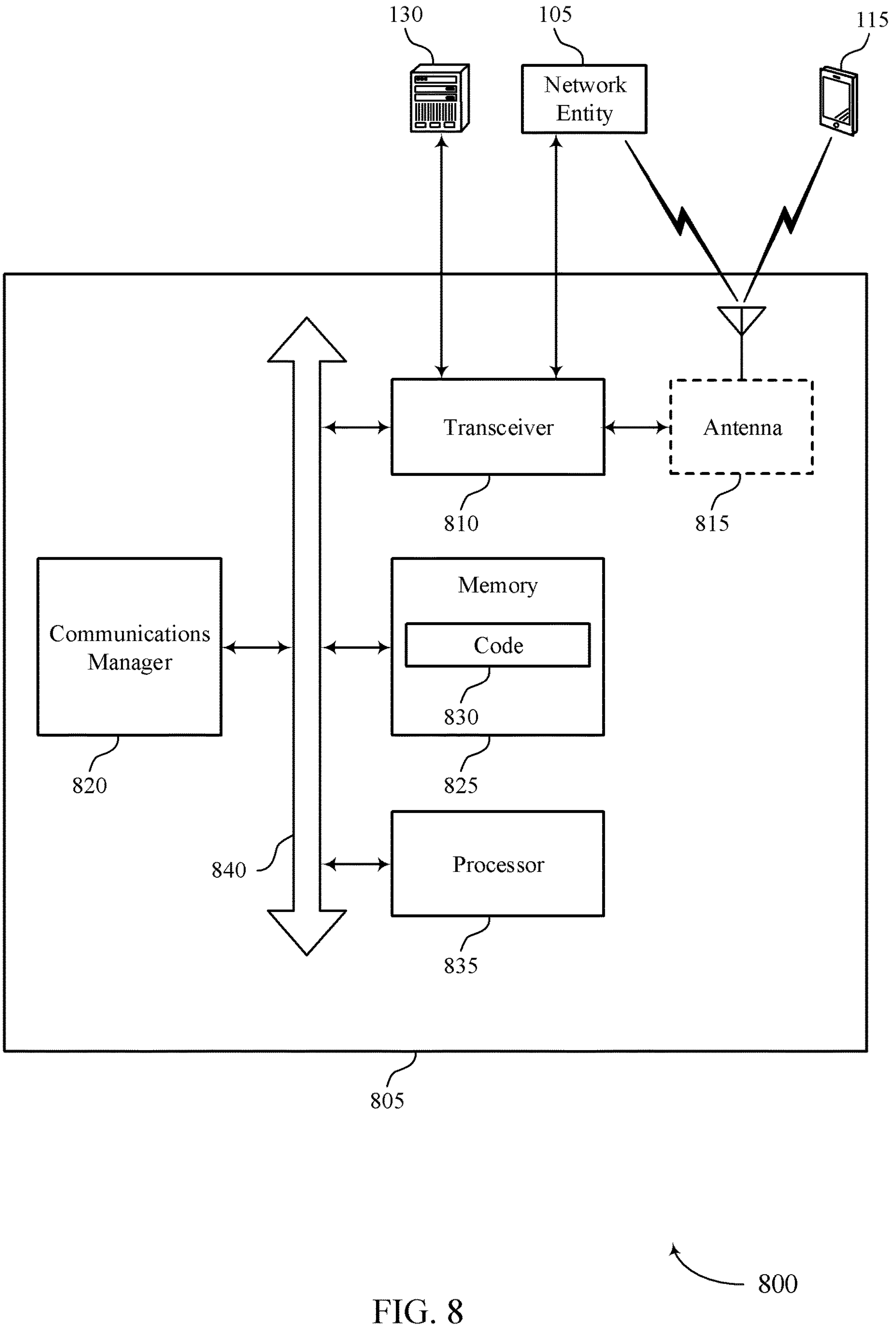
FIG. 8 shows a diagram of a system including a device that supports network assisted detect and avoid systems for aerial vehicles in accordance with one or more aspects of the present disclosure.

FIG. 8 shows a diagram of a system 800 including a device 805 that supports network assisted detect and avoid systems for aerial vehicles in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting network assisted detect and avoid systems for aerial vehicles). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a server in accordance with examples as disclosed herein. For example, the communications manager 820 may be configured as or otherwise support a means for receiving, via a radio access network and from an aircraft, first information associated with the aircraft. The communications manager 820 may be configured as or otherwise support a means for transmitting, to the aircraft in response to receiving the first information, situational information to trigger a situational response by the aircraft while the aircraft operates in a zone associated with the server. The communications manager 820 may be configured as or otherwise support a means for communicating, between the server and an unmanned aircraft service supplier, second information associated with the aircraft, the communicating being via a network function and based on receiving the first information.

Additionally, or alternatively, the communications manager 820 may support communications at a first unmanned aircraft service supplier in accordance with examples as disclosed herein. For example, the communications manager 820 may be configured as or otherwise support a means for receiving, from a discovery and synchronization service, information associated with a second unmanned aircraft service supplier. The communications manager 820 may be configured as or otherwise support a means for receiving, from the second unmanned aircraft service supplier based on receiving the information, detect and avoid service area entity information associated with one or more detect and avoid servers managed by the second unmanned aircraft service supplier. The communications manager 820 may be configured as or otherwise support a means for transmitting, to an aircraft, an indication of the detect and avoid service area entity information that the aircraft can use while operating in an autonomous flying mode.

By including or configuring the communications manager 820 in accordance with examples as described herein, the device 805 may support techniques for improved aircraft safety and reliability by leveraging wireless communication networks to support DAA techniques.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of network assisted detect and avoid systems for aerial vehicles as described herein, or the processor 835 and the memory 825 may be otherwise configured to perform or support such operations.

Figure 9:
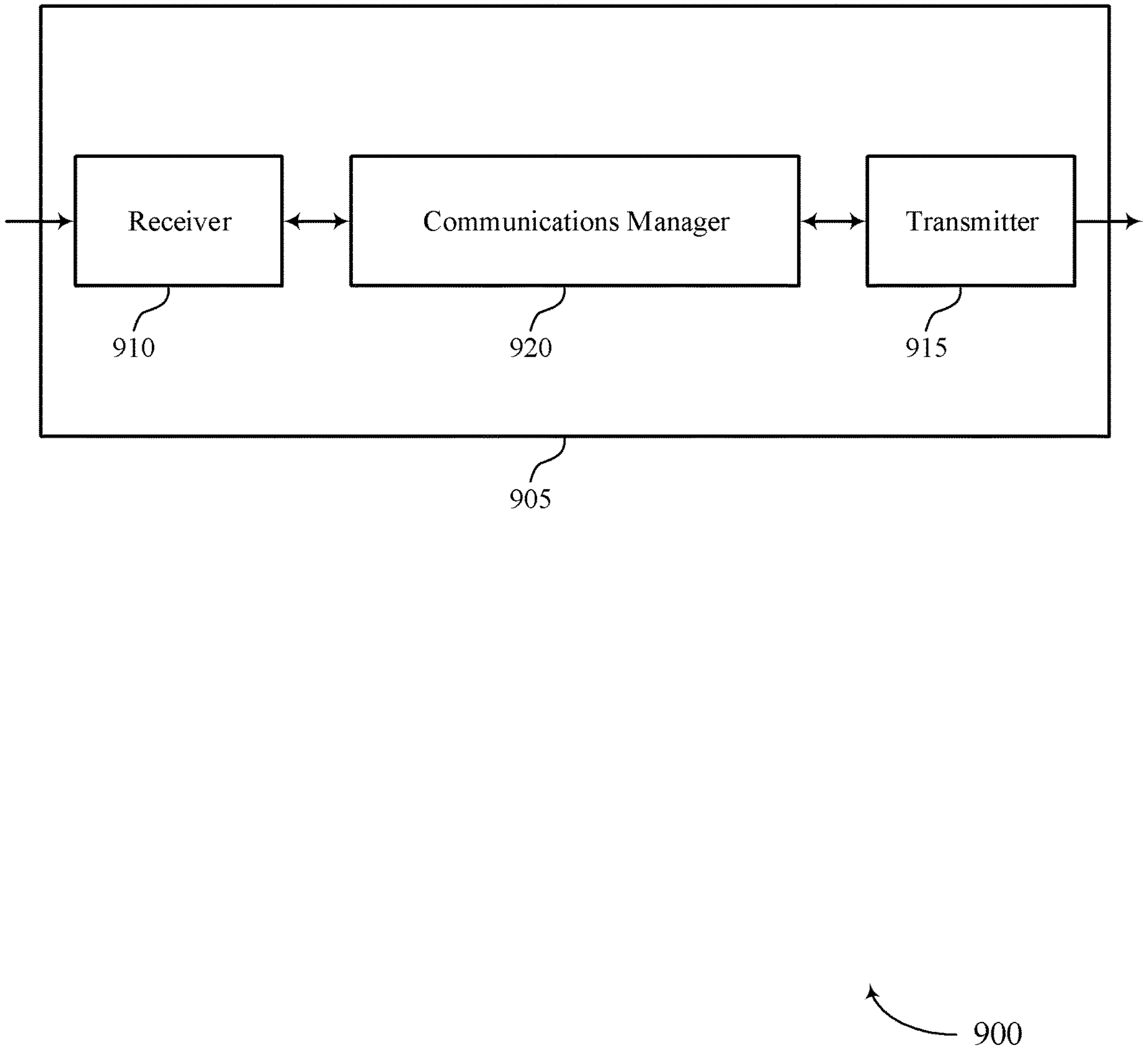
FIGS. 9 and 10 show block diagrams of devices that support network assisted detect and avoid systems for aerial vehicles in accordance with one or more aspects of the present disclosure.

FIG. 9 shows a block diagram 900 of a device 905 that supports network assisted detect and avoid systems for aerial vehicles in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to network assisted detect and avoid systems for aerial vehicles). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network assisted detect and avoid systems for aerial vehicles). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of network assisted detect and avoid systems for aerial vehicles as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications a first aircraft in accordance with examples as disclosed herein. For example, the communications manager 920 may be configured as or otherwise support a means for receiving first information associated with one or more second vehicles. The communications manager 920 may be configured as or otherwise support a means for transmitting, to a server operating in a radio access network and based on receiving the first information associated with the one or more second vehicles, second information associated with the first aircraft. The communications manager 920 may be configured as or otherwise support a means for receiving, from the server based on transmitting the second information, situational information to trigger a situational response by the first aircraft while the first aircraft operates in a zone associated with the server.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for improved aircraft safety and reliability by leveraging wireless communication networks to support DAA techniques.

Figure 10:
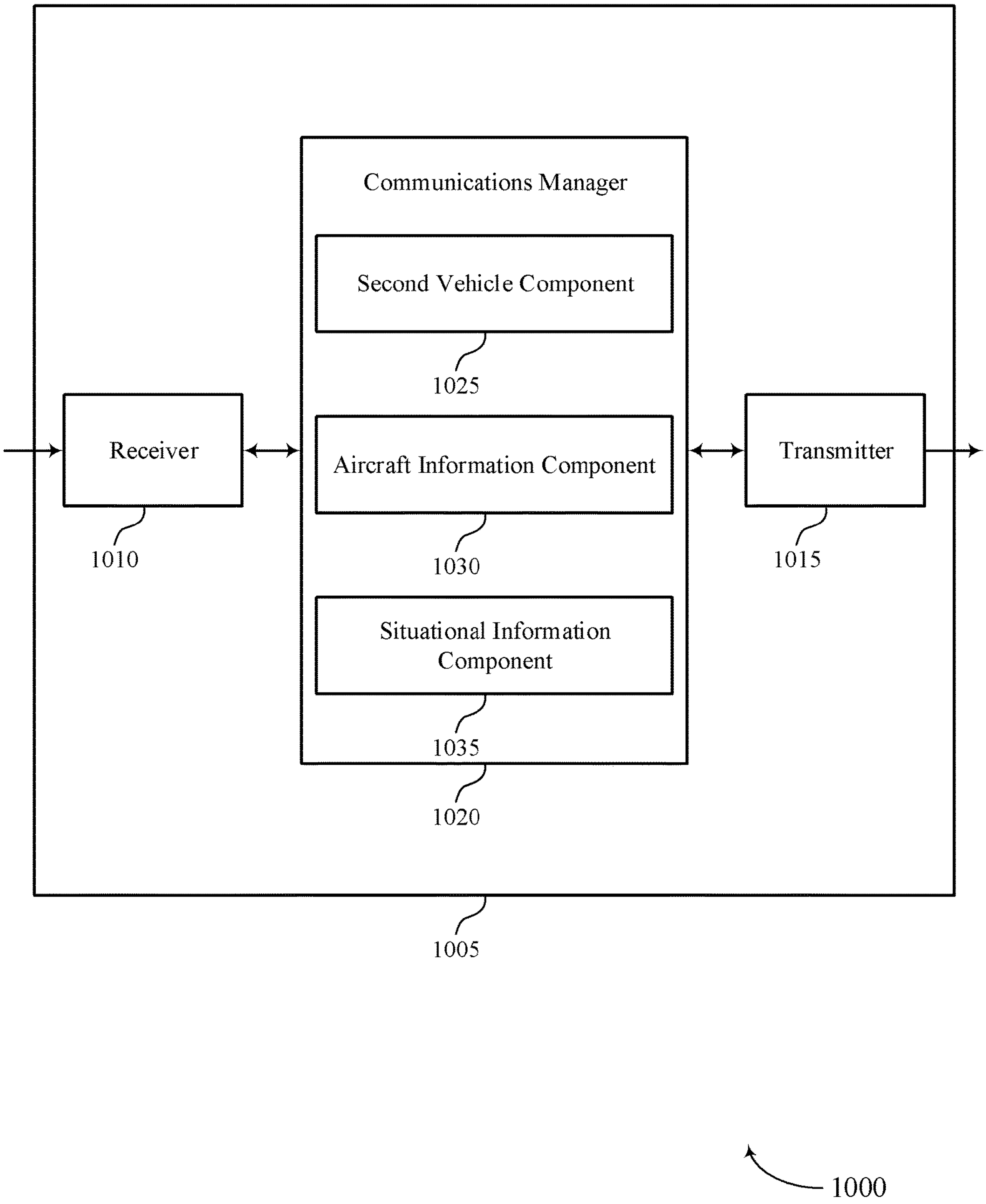

FIG. 10 shows a block diagram 1000 of a device 1005 that supports network assisted detect and avoid systems for aerial vehicles in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to network assisted detect and avoid systems for aerial vehicles). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network assisted detect and avoid systems for aerial vehicles). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of network assisted detect and avoid systems for aerial vehicles as described herein. For example, the communications manager 1020 may include a second vehicle component 1025, an aircraft information component 1030, a situational information component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications a first aircraft in accordance with examples as disclosed herein. The second vehicle component 1025 may be configured as or otherwise support a means for receiving first information associated with one or more second vehicles. The aircraft information component 1030 may be configured as or otherwise support a means for transmitting, to a server operating in a radio access network and based on receiving the first information associated with the one or more second vehicles, second information associated with the first aircraft. The situational information component 1035 may be configured as or otherwise support a means for receiving, from the server based on transmitting the second information, situational information to trigger a situational response by the first aircraft while the first aircraft operates in a zone associated with the server.

Figure 11:
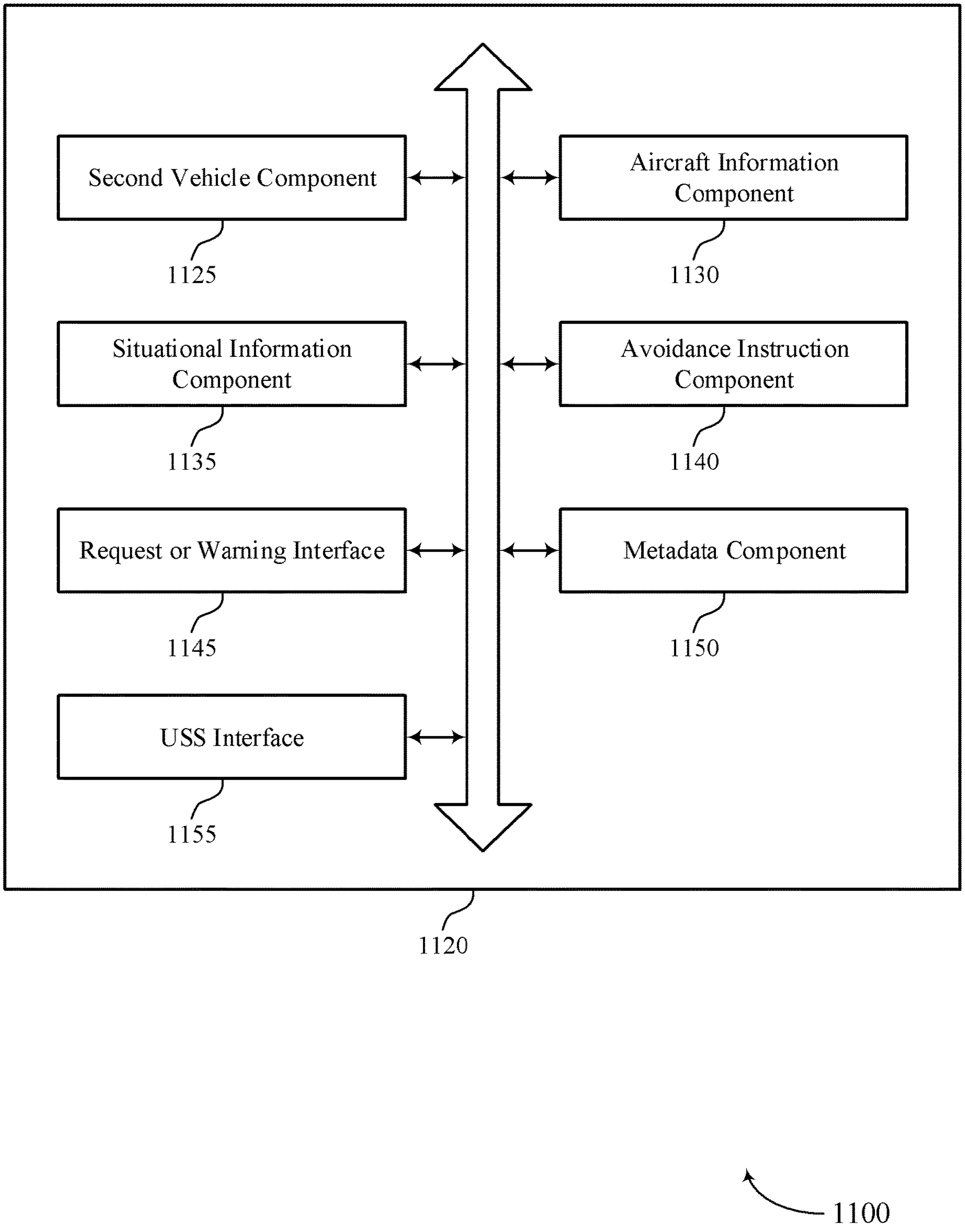
FIG. 11 shows a block diagram of a communications manager that supports network assisted detect and avoid systems for aerial vehicles in accordance with one or more aspects of the present disclosure.

FIG. 11 shows a block diagram 1100 of a communications manager 1120 that supports network assisted detect and avoid systems for aerial vehicles in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of network assisted detect and avoid systems for aerial vehicles as described herein. For example, the communications manager 1120 may include a second vehicle component 1125, an aircraft information component 1130, a situational information component 1135, an avoidance instruction component 1140, a request or warning interface 1145, a metadata component 1150, an USS interface 1155, or any combination thereof. Each of these components may communicate, directly or indirectly, with one another (e.g., via one or more buses).

The communications manager 1120 may support wireless communications a first aircraft in accordance with examples as disclosed herein. The second vehicle component 1125 may be configured as or otherwise support a means for receiving first information associated with one or more second vehicles. The aircraft information component 1130 may be configured as or otherwise support a means for transmitting, to a server operating in a radio access network and based on receiving the first information associated with the one or more second vehicles, second information associated with the first aircraft. The situational information component 1135 may be configured as or otherwise support a means for receiving, from the server based on transmitting the second information, situational information to trigger a situational response by the first aircraft while the first aircraft operates in a zone associated with the server.

In some examples, to support receiving the situational information, the situational information component 1135 may be configured as or otherwise support a means for receiving a warning indicative of a potential conflict associated with the first aircraft.

In some examples, to support receiving the situational information, the avoidance instruction component 1140 may be configured as or otherwise support a means for receiving an indication of an avoidance instruction for avoiding a potential conflict by the first aircraft.

In some examples, to support receiving the situational information, the situational information component 1135 may be configured as or otherwise support a means for receiving information associated with one or more vehicles operating in the zone or another proximal zone.

In some examples, to support receiving the situational information, the situational information component 1135 may be configured as or otherwise support a means for receiving topographical information, ground-based obstruction information, or both associated with the zone or another proximal zone.

In some examples, to support transmitting the second information, the request or warning interface 1145 may be configured as or otherwise support a means for transmitting deconfliction request or conflict warning associated with a potential conflict detected by the first aircraft, where situational information is received based on transmitting the deconfliction request or the conflict warning and includes an avoidance instruction.

In some examples, to support transmitting the second information, the metadata component 1150 may be configured as or otherwise support a means for transmitting metadata associated with the first aircraft, where the metadata includes an aircraft type, an aircraft capability, an aircraft position, an aircraft velocity, an aircraft identity, aircraft operator information, or a combination thereof.

In some examples, the aircraft information component 1130 may be configured as or otherwise support a means for transmitting, to the server, an indication of the first information associated with one or more vehicles received by the first aircraft.

In some examples, the one or more second vehicles include a piloted aircraft, an aircraft operating in the autonomous flying mode, a ground vehicle, or a combination thereof.

In some examples, the first aircraft communicates with the server via an access link, a sidelink, or both.

In some examples, the USS interface 1155 may be configured as or otherwise support a means for receiving, from an unmanned aircraft service supplier, an indication of reachability information for the server, an indication of the zone associated with the server, or both, where the first aircraft communicates with the server based on receiving the reachability information, the indication of the zone, or both.

Figure 12:
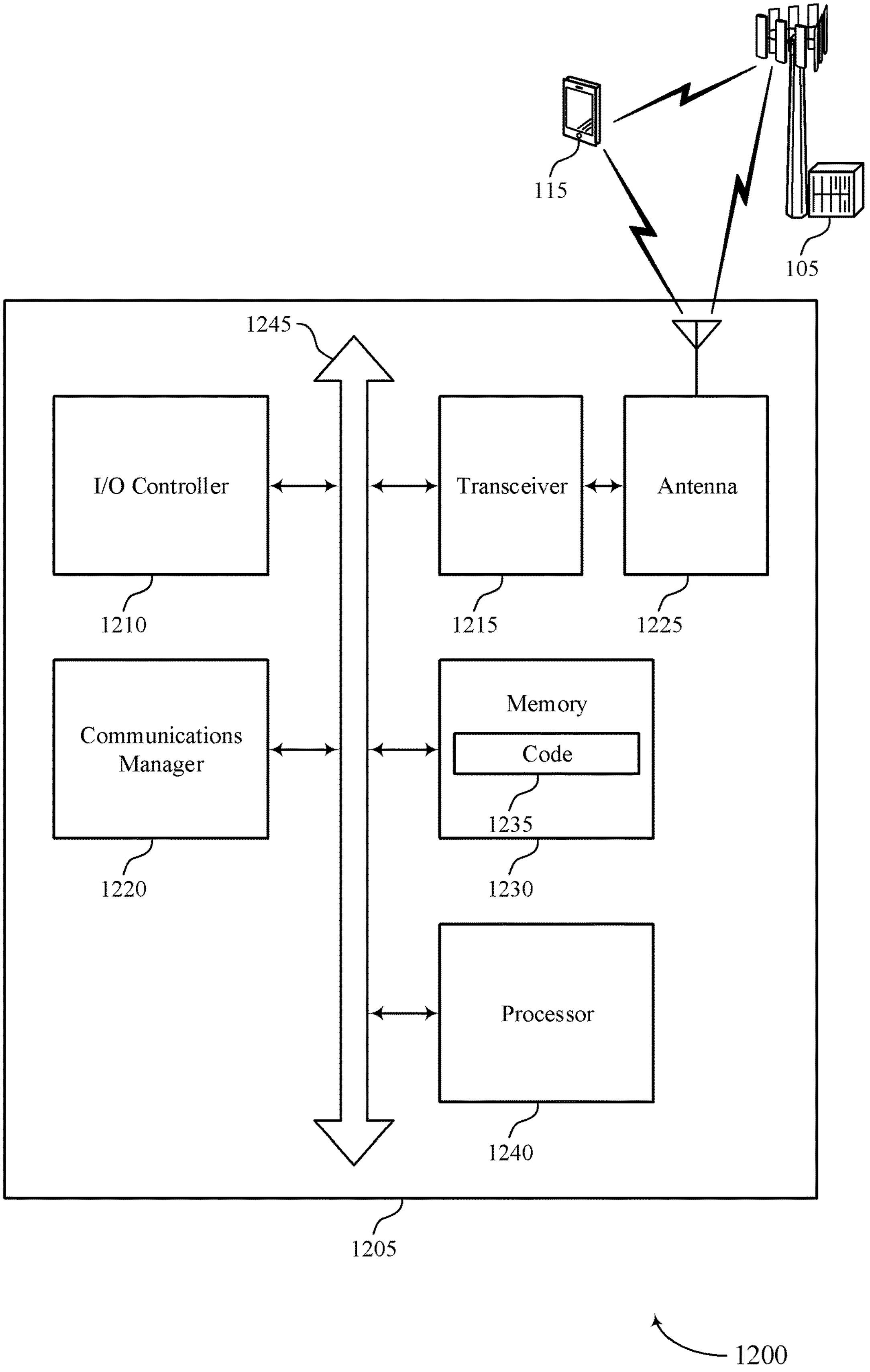
FIG. 12 shows a diagram of a system including a device that supports network assisted detect and avoid systems for aerial vehicles in accordance with one or more aspects of the present disclosure.

FIG. 12 shows a diagram of a system 1200 including a device 1205 that supports network assisted detect and avoid systems for aerial vehicles in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting network assisted detect and avoid systems for aerial vehicles). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications a first aircraft in accordance with examples as disclosed herein. For example, the communications manager 1220 may be configured as or otherwise support a means for receiving first information associated with one or more second vehicles. The communications manager 1220 may be configured as or otherwise support a means for transmitting, to a server operating in a radio access network and based on receiving the first information associated with the one or more second vehicles, second information associated with the first aircraft. The communications manager 1220 may be configured as or otherwise support a means for receiving, from the server based on transmitting the second information, situational information to trigger a situational response by the first aircraft while the first aircraft operates in a zone associated with the server.

By including or configuring the communications manager 1220 in accordance with examples as described herein, the device 1205 may support techniques for improved aircraft safety and reliability by leveraging wireless communication networks to support DAA techniques.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network assisted detect and avoid systems for aerial vehicles as described herein, or the processor 1240 and the memory 1230 may be otherwise configured to perform or support such operations.

Figure 13:
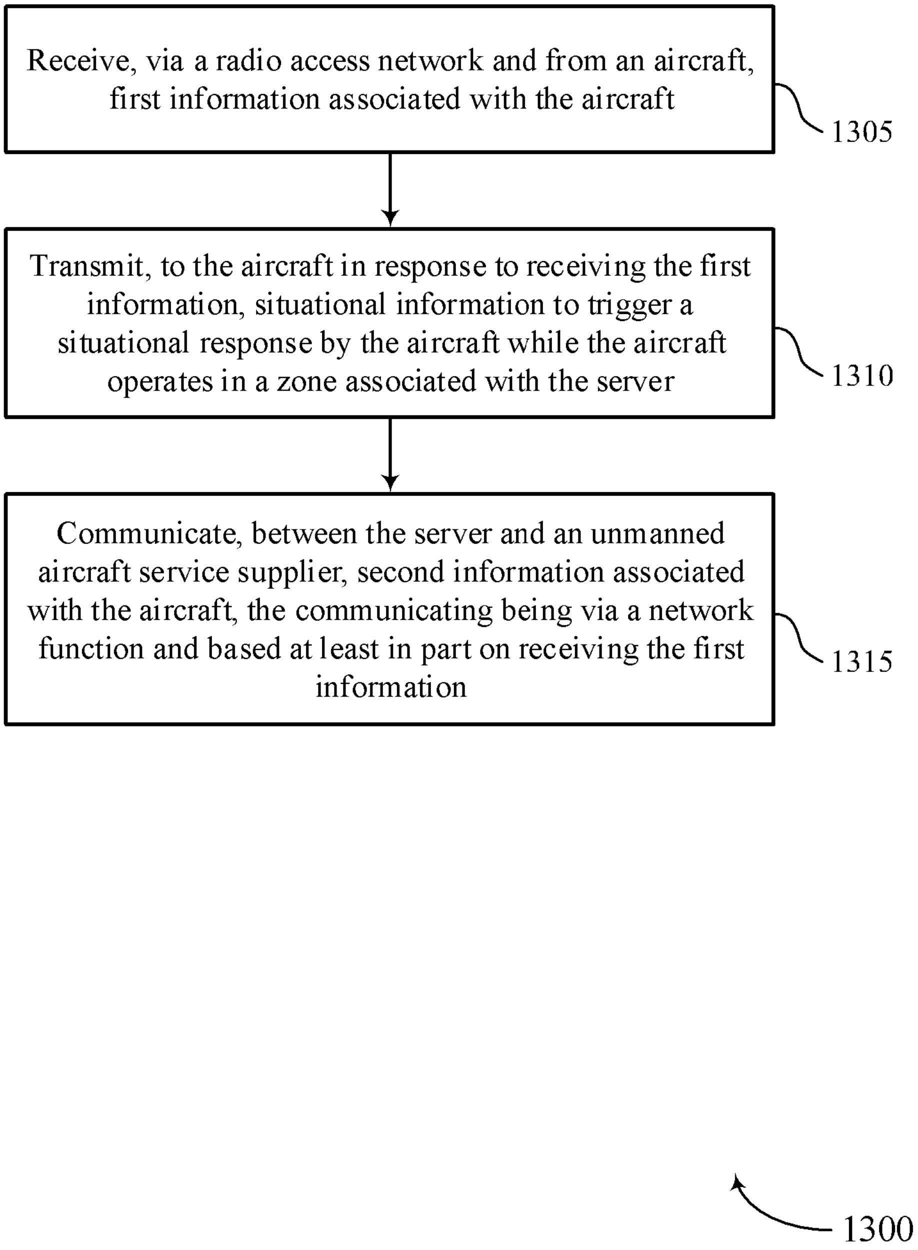
FIGS. 13 through 15 show flowcharts illustrating methods that support network assisted detect and avoid systems for aerial vehicles in accordance with one or more aspects of the present disclosure.

FIG. 13 shows a flowchart illustrating a method 1300 that supports network assisted detect and avoid systems for aerial vehicles in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include receiving, via a radio access network and from an aircraft, first information associated with the aircraft. The operations of 1305 may be performed in accordance with examples as disclosed herein. In some examples, aspects of the operations of 1305 may be performed by an aircraft information component 725 as described with reference to FIG. 7.

At 1310, the method may include transmitting, to the aircraft in response to receiving the first information, situational information to trigger a situational response by the aircraft while the aircraft operates in a zone associated with the server. The operations of 1310 may be performed in accordance with examples as disclosed herein. In some examples, aspects of the operations of 1310 may be performed by a situational information component 730 as described with reference to FIG. 7.

At 1315, the method may include communicating, between the server and an unmanned aircraft service supplier, second information associated with the aircraft, the communicating being via a network function and based at least in part on receiving the first information. The operations of 1315 may be performed in accordance with examples as disclosed herein. In some examples, aspects of the operations of 1315 may be performed by an USS interface 735 as described with reference to FIG. 7.

Figure 14:
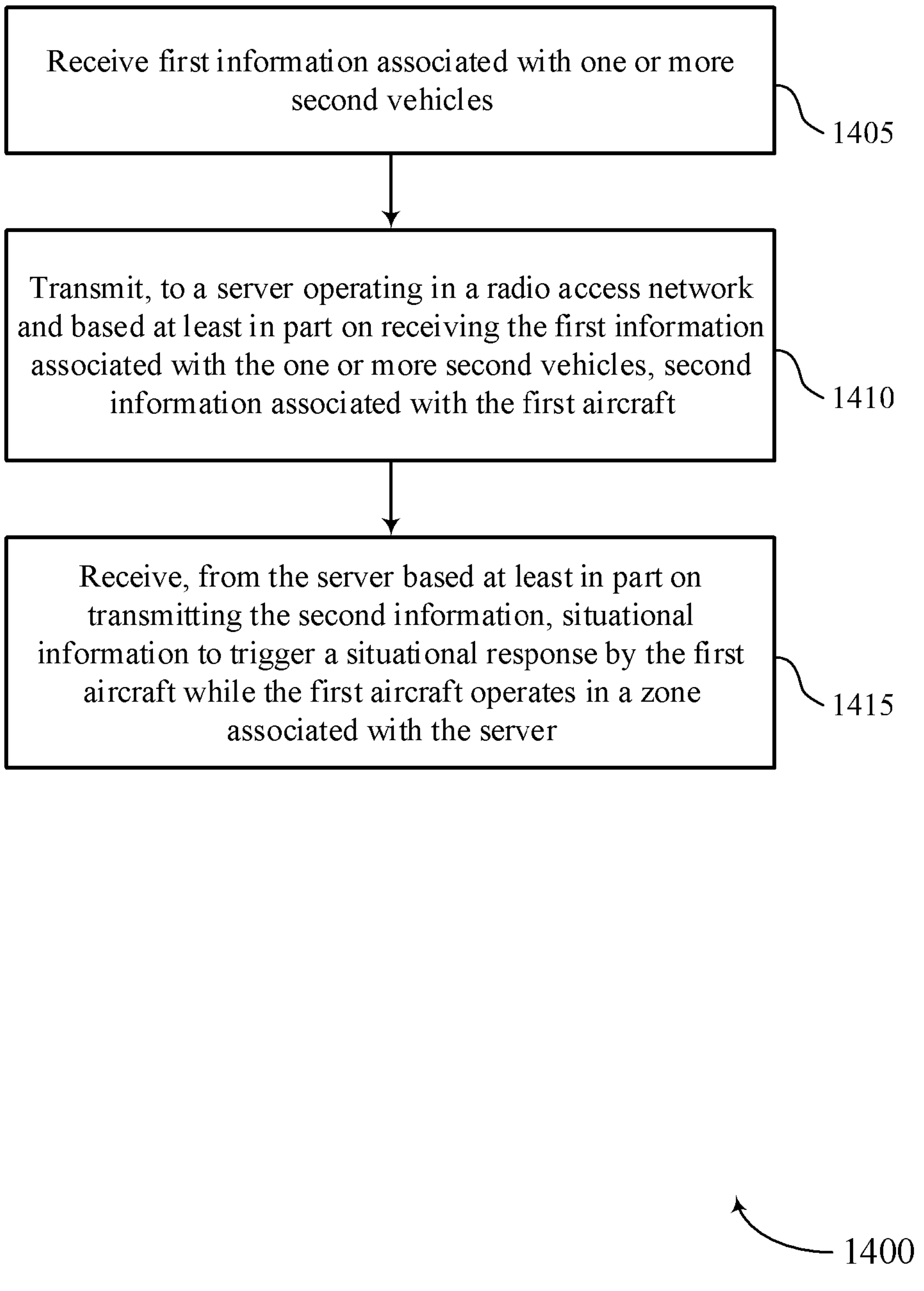

FIG. 14 shows a flowchart illustrating a method 1400 that supports network assisted detect and avoid systems for aerial vehicles in accordance with one or more aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1405, the method may include receiving first information associated with one or more second vehicles. The operations of 1405 may be performed in accordance with examples as disclosed herein. In some examples, aspects of the operations of 1405 may be performed by a second vehicle component 1125 as described with reference to FIG. 11.

At 1410, the method may include transmitting, to a server operating in a radio access network and based at least in part on receiving the first information associated with the one or more second vehicles, second information associated with the first aircraft. The operations of 1410 may be performed in accordance with examples as disclosed herein. In some examples, aspects of the operations of 1410 may be performed by an aircraft information component 1130 as described with reference to FIG. 11.

At 1415, the method may include receiving, from the server based at least in part on transmitting the second information, situational information to trigger a situational response by the first aircraft while the first aircraft operates in a zone associated with the server. The operations of 1415 may be performed in accordance with examples as disclosed herein. In some examples, aspects of the operations of 1415 may be performed by a situational information component 1135 as described with reference to FIG. 11.

Figure 15:
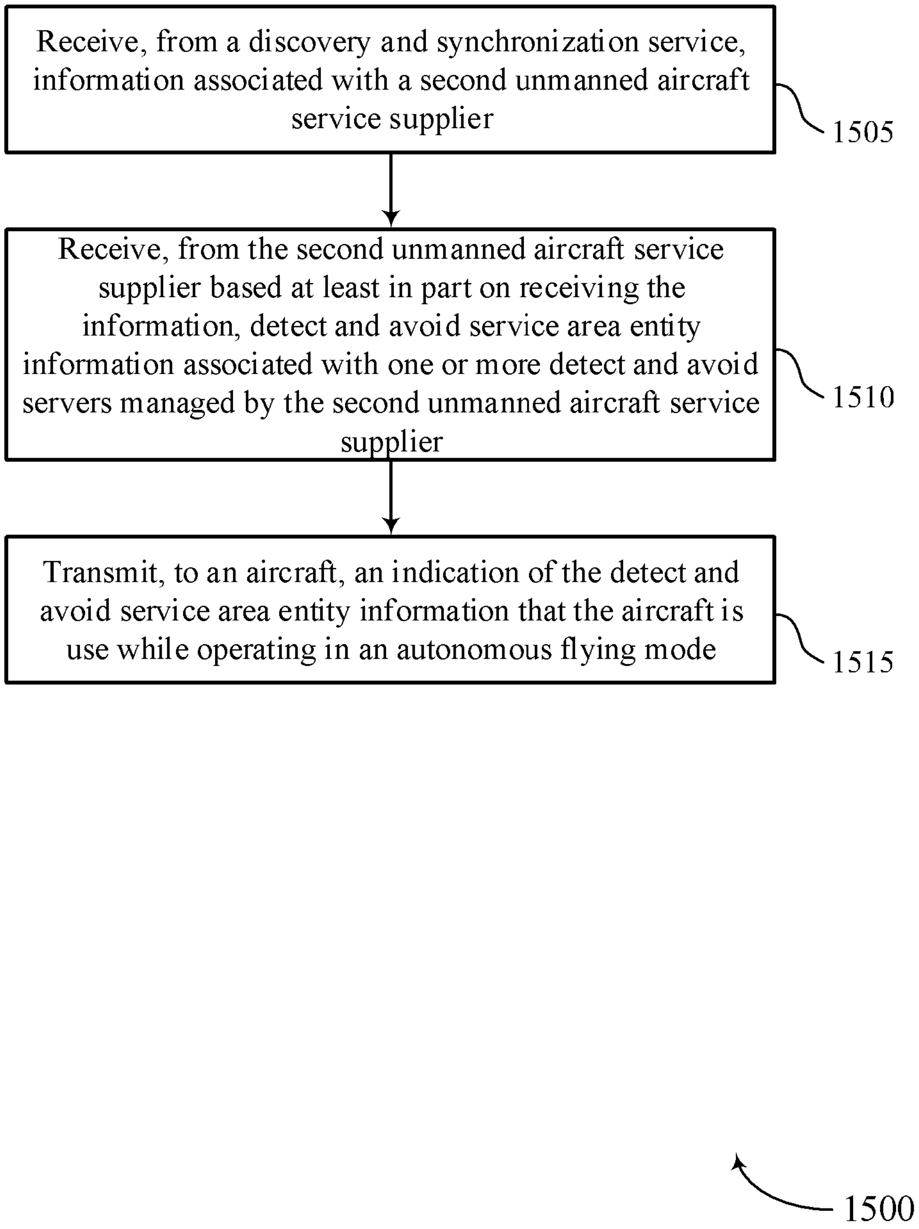

FIG. 15 shows a flowchart illustrating a method 1500 that supports network assisted detect and avoid systems for aerial vehicles in accordance with one or more aspects of the present disclosure. The operations of the method 1500 may be implemented by a network entity or its components as described herein. For example, the operations of the method 1500 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a discovery and synchronization service, information associated with a second unmanned aircraft service supplier. The operations of 1505 may be performed in accordance with examples as disclosed herein. In some examples, aspects of the operations of 1505 may be performed by a DSS interface 740 as described with reference to FIG. 7.

At 1510, the method may include receiving, from the second unmanned aircraft service supplier based at least in part on receiving the information, detect and avoid service area entity information associated with one or more detect and avoid servers managed by the second unmanned aircraft service supplier. The operations of 1510 may be performed in accordance with examples as disclosed herein. In some examples, aspects of the operations of 1510 may be performed by an USS interface 735 as described with reference to FIG. 7.

At 1515, the method may include transmitting, to an aircraft, an indication of the detect and avoid service area entity information that the aircraft can use while operating in an autonomous flying mode. The operations of 1515 may be performed in accordance with examples as disclosed herein. In some examples, aspects of the operations of 1515 may be performed by an aircraft interface 745 as described with reference to FIG. 7.

The following provides an overview of aspects of the present disclosure:

Aspect 1: A method for wireless communications at a server, comprising: receiving, via a radio access network and from an aircraft, first information associated with the aircraft; transmitting, to the aircraft in response to receiving the first information, situational information to trigger a situational response by the aircraft while the aircraft operates in a zone associated with the server; and communicating, between the server and an unmanned aircraft service supplier, second information associated with the aircraft, the communicating being via a network function and based at least in part on receiving the first information.

Aspect 2: The method of aspect 1, wherein transmitting the situational information comprises: transmitting a warning indicative of a potential conflict associated with the aircraft.

Aspect 3: The method of any of aspects 1 through 2, wherein transmitting the situational information comprises: transmitting an indication of an avoidance instruction for avoiding a potential conflict by the aircraft.

Aspect 4: The method of any of aspects 1 through 3, wherein transmitting the situational information comprises: transmitting neighboring vehicle information associated with one or more vehicles operating in the zone or another proximal zone.

Aspect 5: The method of any of aspects 1 through 4, wherein transmitting the situational information comprises: transmit topographical information, ground-based obstruction information, or both associated with the zone or another proximal zone.

Aspect 6: The method of any of aspects 1 through 5, wherein receiving the first information comprises: receiving a deconfliction request or conflict warning associated with a potential conflict detected by the aircraft, wherein situational information is transmitted based at least in part on receiving the deconfliction request or the conflict warning and includes an avoidance instruction.

Aspect 7: The method of any of aspects 1 through 6, wherein receiving the first information comprises: receiving metadata associated with the aircraft, wherein the metadata comprises an aircraft type, an aircraft capability, an aircraft position, an aircraft velocity, an aircraft identity, aircraft operator information, or a combination thereof.

Aspect 8: The method of any of aspects 1 through 7, further comprising: receiving, from the aircraft, third information associated with one or more vehicles detected by the aircraft.

Aspect 9: The method of aspect 8, wherein the one or more vehicles comprise a piloted aircraft, an aircraft operating in the autonomous flying mode, a ground vehicle, or a combination thereof.

Aspect 10: The method of any of aspects 1 through 9, wherein communicating the second information comprises: transmitting, to the unmanned aircraft service supplier, an indication of conflict information associated with the aircraft, an indication of vehicle congestion information of the zone, or a combination thereof.

Aspect 11: The method of any of aspects 1 through 10, wherein communicating the second information comprises: transmitting, to the unmanned aircraft service supplier, a request for the second information associated with the aircraft; and receiving, from the unmanned aircraft service supplier, in response to transmitting the request, the second information.

Aspect 12: The method of any of aspects 1 through 11, further comprising: determining, based at least in part on receiving the first information, that a potential conflict exists for the aircraft, a second aircraft, or both; and transmitting, to the aircraft, the second aircraft, or both, an indication of the potential conflict.

Aspect 13: The method of any of aspects 1 through 12, further comprising: receiving, from one or more sensors associated with the server, zone information associated with the zone, wherein the situational information is based at least in part on the zone information.

Aspect 14: The method of aspect 13, wherein the one or more sensors comprise a detect and avoid broadcast receiver, a broadcast remote identifier receiver, an automatic dependent surveillance-broadcast receiver, a weather sensor, a radar, a new-radio sensor, a lidar, an aircraft transponder, or a combination thereof.

Aspect 15: The method of any of aspects 1 through 14, wherein the server communicates with the aircraft via an access link, a sidelink, or both.

Aspect 16: A method for wireless communications a first aircraft, comprising: receiving first information associated with one or more second vehicles; transmitting, to a server operating in a radio access network and based at least in part on receiving the first information associated with the one or more second vehicles, second information associated with the first aircraft; and receiving, from the server based at least in part on transmitting the second information, situational information to trigger a situational response by the first aircraft while the first aircraft operates in a zone associated with the server.

Aspect 17: The method of aspect 16, wherein receiving the situational information comprises: receiving a warning indicative of a potential conflict associated with the first aircraft.

Aspect 18: The method of any of aspects 16 through 17, wherein receiving the situational information comprises: receiving an indication of an avoidance instruction for avoiding a potential conflict by the first aircraft.

Aspect 19: The method of any of aspects 16 through 18, wherein receiving the situational information comprises: receiving information associated with one or more vehicles operating in the zone or another proximal zone.

Aspect 20: The method of any of aspects 16 through 19, wherein receiving the situational information comprises: receive topographical information, ground-based obstruction information, or both associated with the zone or another proximal zone.

Aspect 21: The method of any of aspects 16 through 20, wherein transmitting the second information comprises: transmitting deconfliction request or conflict warning associated with a potential conflict detected by the first aircraft, wherein situational information is received based at least in part on transmitting the deconfliction request or the conflict warning and includes an avoidance instruction.

Aspect 22: The method of any of aspects 16 through 21, wherein transmitting the second information comprises: transmitting metadata associated with the first aircraft, wherein the metadata comprises an aircraft type, an aircraft capability, an aircraft position, an aircraft velocity, an aircraft identity, aircraft operator information, or a combination thereof.

Aspect 23: The method of any of aspects 16 through 22, further comprising: transmitting, to the server, an indication of the first information associated with one or more vehicles received by the first aircraft.

Aspect 24: The method of any of aspects 16 through 23, wherein the one or more second vehicles comprise a piloted aircraft, an aircraft operating in an autonomous flying mode, a ground vehicle, or a combination thereof.

Aspect 25: The method of any of aspects 16 through 24, wherein the first aircraft communicates with the server via an access link, a sidelink, or both.

Aspect 26: The method of any of aspects 16 through 25, further comprising: receiving, from an unmanned aircraft service supplier, an indication of reachability information for the server, an indication of the zone associated with the server, or both, wherein the first aircraft communicates with the server based at least in part on receiving the reachability information, the indication of the zone, or both.

Aspect 27: A method for communications at a first unmanned aircraft service supplier, comprising: receiving, from a discovery and synchronization service, information associated with a second unmanned aircraft service supplier; receiving, from the second unmanned aircraft service supplier based at least in part on receiving the information, detect and avoid service area entity information associated with one or more detect and avoid servers managed by the second unmanned aircraft service supplier; and transmitting, to an aircraft, an indication of the detect and avoid service area entity information that the aircraft is use.

Aspect 28: The method of aspect 27, wherein receiving the information associated with the second unmanned aircraft service supplier comprises: receiving an indication of reachability information for the one or more detected and avoid servers, a location of the one or more detect avoid servers, a zone identifier associated with the one or more detect and avoid servers, or a combination thereof.

Aspect 29: The method of any of aspects 27 through 28, further comprising: transmitting, to the second unmanned aircraft service supplier in response to receiving the information, a request for the detect and avoid service area entity information, wherein the detect and avoid service area entity information is received based at least in part on transmitting the request.

Aspect 30: An apparatus for wireless communications at a server, comprising a processor; memory coupled with the processor; and instructions stored in the memory and executable by the processor to cause the apparatus to perform a method of any of aspects 1 through 15.

Aspect 31: An apparatus for wireless communications at a server, comprising at least one means for performing a method of any of aspects 1 through 15.

Aspect 32: A non-transitory computer-readable medium storing code for wireless communications at a server, the code comprising instructions executable by a processor to perform a method of any of aspects 1 through 15.

Aspect 33: An apparatus for wireless communications a first aircraft, comprising a processor; memory coupled with the processor; and instructions stored in the memory and executable by the processor to cause the apparatus to perform a method of any of aspects 16 through 26.

Aspect 34: An apparatus for wireless communications a first aircraft, comprising at least one means for performing a method of any of aspects 16 through 26.

Aspect 35: A non-transitory computer-readable medium storing code for wireless communications a first aircraft, the code comprising instructions executable by a processor to perform a method of any of aspects 16 through 26.

Aspect 36: An apparatus for communications at a first unmanned aircraft service supplier, comprising a processor; memory coupled with the processor; and instructions stored in the memory and executable by the processor to cause the apparatus to perform a method of any of aspects 27 through 29.

Aspect 37: An apparatus for communications at a first unmanned aircraft service supplier, comprising at least one means for performing a method of any of aspects 27 through 29.

Aspect 38: A non-transitory computer-readable medium storing code for communications at a first unmanned aircraft service supplier, the code comprising instructions executable by a processor to perform a method of any of aspects 27 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a server, comprising:
- a processor;
- memory coupled with the processor; and
- instructions stored in the memory and executable by the processor to cause the apparatus to:
  - receive, via a radio access network and from an aircraft, first information associated with the aircraft;
  - transmit, to the aircraft in response to receiving the first information, situational information to trigger a situational response by the aircraft while the aircraft operates in a zone associated with the server; and
  - communicate, between the server and an unmanned aircraft service supplier, second information associated with the aircraft, the communication being via a network function of a core network and based at least in part on receiving the first information.

2. The apparatus of claim 1, wherein the instructions to transmit the situational information are executable by the processor to cause the apparatus to:
- transmit a warning indicative of a potential conflict associated with the aircraft.

3. The apparatus of claim 1, wherein the instructions to transmit the situational information are executable by the processor to cause the apparatus to:
- transmit an indication of an avoidance instruction for avoiding a potential conflict by the aircraft.

4. The apparatus of claim 1, wherein the instructions to transmit the situational information are executable by the processor to cause the apparatus to:
- transmit neighboring vehicle information associated with one or more vehicles operating in the zone or another proximal zone.

5. The apparatus of claim 1, wherein the instructions to transmit the situational information are executable by the processor to cause the apparatus to:
- transmit topographical information, ground-based obstruction information, or both associated with the zone or another proximal zone.

6. The apparatus of claim 1, wherein the instructions to receive the first information are executable by the processor to cause the apparatus to:
- receive a deconfliction request or conflict warning associated with a potential conflict detected by the aircraft, wherein situational information is transmitted based at least in part on receiving the deconfliction request or the conflict warning and includes an avoidance instruction.

7. The apparatus of claim 1, wherein the instructions to receive the first information are executable by the processor to cause the apparatus to:
- receive metadata associated with the aircraft, wherein the metadata comprises an aircraft type, an aircraft capability, an aircraft position, an aircraft velocity, an aircraft identity, aircraft operator information, or a combination thereof.

8. The apparatus of claim 1, wherein the instructions are further executable by the processor to cause the apparatus to:
- receive, from the aircraft, third information associated with one or more vehicles detected by the aircraft.

9. The apparatus of claim 8, wherein the one or more vehicles comprise a piloted aircraft, an aircraft operating in an autonomous flying mode, a ground vehicle, or a combination thereof.

10. The apparatus of claim 1, wherein the instructions to communicate the second information are executable by the processor to cause the apparatus to:
- transmit, to the unmanned aircraft service supplier, an indication of conflict information associated with the aircraft, an indication of vehicle congestion information of the zone, or a combination thereof.

11. The apparatus of claim 1, wherein the instructions to communicate the second information are executable by the processor to cause the apparatus to:
- transmit, to the unmanned aircraft service supplier, a request for the second information associated with the aircraft; and
- receive, from the unmanned aircraft service supplier, in response to transmitting the request, the second information.

12. The apparatus of claim 1, wherein the instructions are further executable by the processor to cause the apparatus to:
- determine, based at least in part on receiving the first information, that a potential conflict exists for the aircraft, a second aircraft, or both; and
- transmit, to the aircraft, the second aircraft, or both, an indication of the potential conflict.

13. The apparatus of claim 1, wherein the instructions are further executable by the processor to cause the apparatus to:

receive, from one or more sensors associated with the server, zone information associated with the zone, wherein the situational information is based at least in part on the zone information.

14. The apparatus of claim 13, wherein the one or more sensors comprise a detect and avoid broadcast receiver, a broadcast remote identifier receiver, an automatic dependent surveillance-broadcast receiver, a weather sensor, a radar, a new-radio sensor, a lidar, an aircraft transponder, or a combination thereof.

15. The apparatus of claim 1, wherein the server communicates with the aircraft via an access link, a sidelink, or both.

16. The apparatus of claim 1, wherein the server is associated with a detect and avoid service area discoverable via a discovery and synchronization service, and wherein the zone is one of a plurality of zones within the detect and avoid service area, the detect and avoid service area being managed by the unmanned aircraft service supplier or a second unmanned aircraft service supplier.

17. An apparatus for wireless communications at a first aircraft, comprising:

a processor;

memory coupled with the processor; and instructions stored in the memory and executable by the processor to cause the apparatus to:

receive, from an unmanned aircraft service supplier, an indication of reachability information for a server operating in a radio access network and an indication of a zone associated with the server;

receive first information associated with one or more second vehicles;

transmit, to the server based at least in part on the reachability information and the indication of the zone, and based at least in part on receiving the first information associated with the one or more second vehicles, second information associated with the first aircraft; and receive, from the server based at least in part on transmission of the second information, situational information to trigger a situational response by the first aircraft while the first aircraft operates in the zone associated with the server.

18. The apparatus of claim 17, wherein the instructions to receive the situational information are executable by the processor to cause the apparatus to:

receive a warning indicative of a potential conflict associated with the first aircraft.

19. The apparatus of claim 17, wherein the instructions to receive the situational information are executable by the processor to cause the apparatus to:

receive an indication of an avoidance instruction for avoiding a potential conflict by the first aircraft.

20. The apparatus of claim 17, wherein the instructions to receive the situational information are executable by the processor to cause the apparatus to:

receive information associated with one or more vehicles operating in the zone or another proximal zone.

21. The apparatus of claim 17, wherein the instructions to receive the situational information are executable by the processor to cause the apparatus to:

receive topographical information, ground-based obstruction information, or both associated with the zone or another proximal zone.

22. The apparatus of claim 17, wherein the instructions to transmit the second information are executable by the processor to cause the apparatus to:

transmit deconfliction request or conflict warning associated with a potential conflict detected by the first aircraft, wherein situational information is received based at least in part on transmitting the deconfliction request or the conflict warning and includes an avoidance instruction.

23. The apparatus of claim 17, wherein the instructions to transmit the second information are executable by the processor to cause the apparatus to:

transmit metadata associated with the first aircraft, wherein the metadata comprises an aircraft type, an aircraft capability, an aircraft position, an aircraft velocity, an aircraft identity, aircraft operator information, or a combination thereof.

24. The apparatus of claim 17, wherein the instructions are further executable by the processor to cause the apparatus to:

transmit, to the server, an indication of the first information associated with one or more vehicles received by the first aircraft.

25. The apparatus of claim 17, wherein the one or more second vehicles comprise a piloted aircraft, an aircraft operating in an autonomous flying mode, a ground vehicle, or a combination thereof.

26. The apparatus of claim 17, wherein:

the first aircraft communicates with the server via an access link, a sidelink, or both.

27. The apparatus of claim 17, wherein the indication of reachability information and the indication of the zone are based on a discovery and synchronization service used by the unmanned aircraft service supplier to discover a detect and avoid service area associated with a second unmanned aircraft service supplier that manages the server.

28. A method for wireless communications at a server, comprising:

receiving, via a radio access network and from an aircraft, first information associated with the aircraft;

transmitting, to the aircraft in response to receiving the first information, situational information to trigger a situational response by the aircraft while the aircraft operates in a zone associated with the server; and communicating, between the server and an unmanned aircraft service supplier, second information associated with the aircraft, the communicating being via a network function of a core network and based at least in part on receiving the first information.

29. The method of claim 28, wherein transmitting the situational information comprises:

transmitting an indication of an avoidance instruction for avoiding a potential conflict by the aircraft.

30. The method of claim 28, wherein receiving the first information comprises:

receiving a deconfliction request or conflict warning associated with a potential conflict detected by the aircraft, wherein situational information is transmitted based at least in part on receiving the deconfliction request or the conflict warning and includes an avoidance instruction.

31. A method for wireless communications at a first aircraft, comprising:

receiving, from an unmanned aircraft service supplier, an indication of reachability information for a server operating in a radio access network and an indication of a zone associated with the server;

receiving first information associated with one or more second vehicles;

transmitting, to the server based at least in part on the reachability information and the indication of the zone, and based at least in part on receiving the first information associated with the one or more second vehicles, second information associated with the first aircraft; and receiving, from the server based at least in part on transmitting the second information, situational information to trigger a situational response by the first aircraft while the first aircraft operates in the zone associated with the server.

* * * * *